(12) United States Patent
Hsieh et al.

(10) Patent No.: US 12,216,824 B2
(45) Date of Patent: Feb. 4, 2025

(54) MUTE-ABLE INPUT DEVICE WITH KEYSTROKE TACTILE FEEDBACK

(71) Applicant: Darfon Electronics Corp., Taoyuan (TW)

(72) Inventors: Yu-Chun Hsieh, Taoyuan (TW); Chen Yang, Taoyuan (TW); Shao-Lun Hsiao, Taoyuan (TW); Po-Yueh Chou, Taoyuan (TW)

(73) Assignee: DARFON ELECTRONICS CORP., Taoyuan (TW)

( * ) Notice: Subject to any disclaimer, the term of this patent is extended or adjusted under 35 U.S.C. 154(b) by 114 days.

(21) Appl. No.: 17/819,649

(22) Filed: Aug. 15, 2022

(65) Prior Publication Data

US 2023/0052943 A1 Feb. 16, 2023

(30) Foreign Application Priority Data

Aug. 16, 2021 (TW) ................................ 110130167
Jul. 4, 2022 (TW) ................................ 111124943

(51) Int. Cl.
*G06F 3/01* (2006.01)
*G06F 3/02* (2006.01)
(Continued)

(52) U.S. Cl.
CPC ............ *G06F 3/016* (2013.01); *G06F 3/0216* (2013.01); *G06F 3/03541* (2013.01); *H01H 13/85* (2013.01); *H01H 2215/03* (2013.01)

(58) Field of Classification Search
CPC .... G06F 3/016; G06F 3/0216; G06F 3/03541; G06F 3/02; G06F 3/0202; G06F 3/0219;
(Continued)

(56) References Cited

U.S. PATENT DOCUMENTS

| 4,265,557 A | 5/1981 | Runge |
| 6,195,033 B1 | 2/2001 | Darbee et al. |

(Continued)

FOREIGN PATENT DOCUMENTS

| CN | 2716902 Y | 8/2005 |
| CN | 101320646 A | 12/2008 |

(Continued)

OTHER PUBLICATIONS

Chinese language office action dated Apr. 27, 2023, issued in application No. TW 111124943.
(Continued)

*Primary Examiner* — Franklin D Balseca
(74) *Attorney, Agent, or Firm* — McClure, Qualey & Rodack, LLP

(57) ABSTRACT

A mute-able input device with keystroke tactile feedback includes: a plurality of keys, each including a tactile structure and a sound-generating structure for respectively generating operational tactile feedback and operating sounds; a plurality of adjusting mechanisms, each including an adjusting portion corresponding to one of the keys; at least one switching unit including an operating portion and a switch member, the operating portion connecting the switch member and the adjusting mechanism, the switch member generating a switching signal involving a mode switching between different tactile modes or different sound modes for one or more keys. When the operating portion moves in response to a force, the switch member is triggered to achieve the mode switching; meanwhile, the adjusting portion moves to interfere with at least one of the tactile structure or the sound-generating structure along with the movement of the operating portion.

20 Claims, 19 Drawing Sheets

(51) Int. Cl.
*G06F 3/0354* (2013.01)
*H01H 13/85* (2006.01)

(58) Field of Classification Search
CPC ........... G06F 3/0231; H01H 2003/008; H01H 13/84; H01H 13/85; H01H 2215/00; H01H 2215/03; H01H 2215/032
See application file for complete search history.

(56) References Cited

U.S. PATENT DOCUMENTS

| | | | |
|---|---|---|---|
| 7,161,584 | B2 | 1/2007 | Maroun |
| 7,710,397 | B2 | 5/2010 | Krah et al. |
| 10,259,384 | B2 | 4/2019 | Teng et al. |
| 10,401,980 | B2 * | 9/2019 | Tsai ............... G06F 3/03543 |
| 10,409,397 | B2 | 9/2019 | Tsai et al. |
| 10,515,508 | B2 | 12/2019 | Brandau |
| 10,758,311 | B2 * | 9/2020 | Kelly ............... A61B 34/74 |
| 10,832,647 | B2 | 11/2020 | Wang |
| 11,009,954 | B2 | 5/2021 | Verbeke et al. |
| 11,579,695 | B2 * | 2/2023 | Gajiwala ............ G06F 3/016 |
| 11,599,202 | B2 * | 3/2023 | Kauh ................ G06F 3/0362 |
| 2010/0171702 | A1 | 7/2010 | Cheng |
| 2013/0126323 | A1 | 5/2013 | Hsu et al. |
| 2013/0141335 | A1 | 6/2013 | Chen |
| 2019/0206634 | A1 | 7/2019 | Chang et al. |
| 2019/0238131 | A1 | 8/2019 | Yang et al. |
| 2019/0294258 | A1 | 9/2019 | Forlines et al. |

FOREIGN PATENT DOCUMENTS

| | | |
|---|---|---|
| CN | 103150028 A | 6/2013 |
| CN | 104599884 B | 11/2016 |
| CN | 109284016 A | 1/2019 |
| CN | 209015959 U | 6/2019 |
| CN | 209282108 U | 8/2019 |
| CN | 110554773 A | 12/2019 |
| CN | 112289610 A | 1/2021 |
| CN | 112384885 A | 2/2021 |
| CN | 113053686 A | 6/2021 |
| TW | 437971 U | 5/2001 |
| TW | 512949 U | 12/2002 |
| TW | M288406 U | 3/2006 |
| TW | I475432 B | 3/2015 |
| TW | 201624203 A | 7/2016 |
| TW | 201915670 A | 4/2019 |
| TW | I691871 B | 4/2020 |
| TW | M627621 U | 6/2022 |
| WO | 2023044596 A1 | 3/2023 |

OTHER PUBLICATIONS

Non-Final Office Action dated Apr. 24, 2023, issued in U.S. Appl. No. 17/841,801.
TW Office Action dated Aug. 29, 2023 issued in Taiwan application No. 111128019.
Final Office Action issued in U.S. Appl. No. 17/841,801, filed Jun. 16, 2022, mailed Oct. 23, 2023.

* cited by examiner

MUTE-ABLE INPUT DEVICE WITH KEYSTROKE TACTILE FEEDBACK

BACKGROUND OF THE INVENTION

1. Field of the Invention

The invention generally relates to an input device with adjustable tactile feedback. Particularly, the invention relates to an input device capable of changing the input feedback in response to the switching of tactile mode.

2. Description of the Prior Art

Input devices such as mouses and keyboards use keys as the main user interface. In general, when the user presses the key of the input device to actuate a keystroke action, the input device will generate a click sound accordingly. Recently, silent input devices which do not produce the click sound when being pressed are developed in response to the operation requirements in a quiet environment. However, in order to reduce or eliminate the click sound, the existing silent input device also prevents the user from receiving sufficient operation feedback.

SUMMARY OF THE INVENTION

It is an object of the invention to provide an input device with adjustable tactile feedback, which is capable of outputting corresponding keystroke sounds respectively in the mute-on mode and the mute-off mode, so as to provide the user with operation feedback of different timbres or volumes.

In an embodiment, the invention provides an input device, which is directly or indirectly coupled to an output device. The input device includes at least one key, a switching unit, and an adjusting mechanism. The at least one key has a tactile structure and a sound-generating structure adjustably interfering with an operation path of the at least one key to respectively generate a tactile feedback and an operating sound. The switching unit has an operating portion operable by a user. The switching unit is capable of generating a switching signal involving a mode switching of the at least one key between different tactile modes and/or different sound modes. The adjusting mechanism has at least one adjusting portion adapted to move in response to the mode switching to drive the tactile structure and/or the sound-generating structure, so as to adjust an interference ratio of the tactile structure and/or the sound-generating structure to the operation path. After the mode switching occurs, the output device outputs an operation feedback as the at least one key is triggered.

Optionally, in an embodiment, the input device is a keyboard. The adjusting mechanism includes an adjusting plate for disposing the at least one adjusting portion. The at least one adjusting portion abuts against the tactile structure and/or the sound-generating structure and is adapted to push the tactile structure and/or the sound-generating structure as the adjusting plate moves, so as to adjust the interference ratio of the tactile structure and/or the sound-generating structure to the operation path.

Optionally, in an embodiment, the input device is a keyboard, and the input device further includes an electric drive module coupled to the switching unit and the adjusting mechanism. The electric drive module directly or indirectly drives the at least one adjusting portion to move in response to the switching signal.

Optionally, in an embodiment, the input device is a keyboard, and the input device further includes a linkage mechanism coupled to the switching unit and the adjusting mechanism. When the operating portion of the switching unit receives a force to move, the linkage mechanism directly or indirectly drives the at least one adjusting portion of the adjusting mechanism to move.

Optionally, in an embodiment, the input device is a keyboard, and the input device further includes a linkage mechanism coupled to the switching unit and the adjusting mechanism. When the operating portion of the switching unit receives a force to rotate, the linkage mechanism directly or indirectly drives the at least one adjusting portion of the adjusting mechanism to move.

Optionally, in an embodiment, the input device is a mouse. The at least one key includes a roller. The tactile structure and/or the sound-generating structure includes a ratchet co-axially disposed with the roller. The adjusting mechanism includes a transmission arm coupled to the at least one adjusting portion. The at least one adjusting portion has a bump selectively engaging with or disengaging from at least one ratchet tooth of the ratchet to achieve the mode switching.

Optionally, in an embodiment, the input device is a mouse. The switching unit and the adjusting mechanism are at least partially located under the at least one key. The switching unit includes the operating portion in a turning knob form and a linkage mechanism in a long rod form. The adjusting mechanism includes a plurality of blocks located on the linkage mechanism at different positions and different angles. When the switching unit receives a force to rotate, one of the plurality of blocks abuts below the at least one key to switch a pressing fulcrum or an operation distance of the at least one key, so as to achieve the mode switching.

Optionally, in an embodiment, the at least one key is a microswitch. At least one of the tactile structure and the sound-generating structure includes an elastic member. The elastic member has an upper end adapted to move close to or away from a distal end of the elastic member as the microswitch is pressed under a force or released from the force. The distal end extends to be located between a first surface and a second surface in the microswitch. The distal end of the elastic member is temporarily positioned on one of the first surface and the second surface in response to the movement of the adjusting mechanism to achieve the mode switching.

Optionally, in an embodiment, the switching unit includes a switch member capable of generating the switching signal when the switch member is triggered. The switch member includes at least one of a functional key, a combination of keys, a movable switch, a pair of conductive electrodes, a capacitive switch, and optical switch, a magnetic switch, or a piezoelectric switch.

Optionally, in an embodiment, the tactile structure and/or the sound-generating structure includes at least one of a torsion spring, a leaf spring, a cantilever, or a linkage structure.

Optionally, in an embodiment, the input device and the output device are coupled to a host in a wired or wireless manner. After the switching signal is generated, the host outputs the operation feedback to the output device for output.

In another embodiment, the invention provides an input feedback method applicable to an input device and an output device directly or indirectly coupled with each other. The input device includes at least one key. A tactile structure of the at least one key adjustably interferes with an operation path of the at least one key to provide a tactile feedback when the at least one key is in a first tactile mode and a mute-on mode, the method includes: in the first tactile mode, a switching unit of the input device generating a switching signal; an adjusting mechanism of the input device adjusting an interference ratio of the tactile structure to the operation path to enable the at least one key to enter a second tactile mode while the at least one key remains in the mute-on mode; the at least one key generating an input signal when being pressed and triggered; and the output device outputting a second operation feedback when the at least one key is triggered in the second tactile mode.

Optionally, in an embodiment, the input device and the output device are coupled to a host in a wired or wireless manner. After the switching signal is generated, the host outputs the second operation feedback to the output device for output.

Optionally, in an embodiment, the at least one key further includes a sound-generating structure adjustably interfering or not interfering with the operation path of the at least one key to selectively generate an operating sound.

In another embodiment, the invention provides an input feedback method applicable to an input device and a near-ear device directly or indirectly coupled with each other. The input device includes at least one key having a tactile structure and a sound-generating structure adjustably interfering with an operation path of the at least one key to respectively generate a tactile feedback and a keystroke sound. The method includes: a switching unit of the input device generating a switching signal; an adjusting mechanism of the input device adjusting the sound-generating structure so as not to interfere with the operation path; the at least one key generating an input signal without triggering the sound-generating structure when the at least one key is pressed and triggered; and the near-ear device outputting a corresponding operation sound file when the at least one key is triggered in the second tactile mode.

Optionally, in an embodiment, the input device and the near-ear device are coupled to a host in a wired or wireless manner. After the switching signal is generated, the host outputs the operation sound file to the near-ear device for output.

In a derived embodiment, the invention provides an input device including a plurality of keys, each of the keys having a tactile structure and a sound-generating structure to respectively generate a tactile feedback and an operating sound when the key is pressed; a plurality of adjusting mechanisms, each of the adjusting mechanisms having an adjusting portion corresponding to a corresponding one of the keys; and at least one switching unit having an operating portion and a switch member, the operating portion coupled to the switch member and the adjusting mechanisms, the switch member capable of generating a switching signal involving a mode switching of the keys between different tactile modes and/or different sound modes, wherein when the operating portion receives a force to move, the switch member is triggered to achieve the mode switching; meanwhile, the adjusting mechanism moves with the operating portion to enable the adjusting portion to interfere with at least one of the tactile structure and the sound-generating structure.

Optionally, the input device is coupled to an output device. After the mode switching occurs, the output device outputs an operation feedback when one of the keys is pressed.

Optionally, the input device is coupled to an output device. The output device outputs a switching feedback when the mode switching occurs.

Optionally, each of the keys includes a pressable portion and a microswitch. The tactile structure and the sound-generating structure are disposed in the microswitch. When the pressable portion receives a force to move downward, the force is transferred to the tactile structure and/or the sound-generating structure.

Optionally, each of the keys includes a microswitch. The sound-generating structure has a hitting portion located between a first surface and a second surface in the microswitch. The hitting portion moves with the adjusting mechanism to be positioned on the second surface to achieve the mode switching.

Optionally, each of two of the keys includes a microswitch. The switch member is located between two parallel extension lines of the two microswitches. The operating portion is perpendicular to the two parallel extension lines of the two microswitches.

Optionally, the sound-generating structure is interfered and restricted by the adjusting mechanism, so the sound-generating structure does not generate the operating sound when the key is pressed.

Optionally, the adjusting mechanism interferes with the sound-generating structure and does not interfere with the tactile structure, so the sound-generating structure is inoperable when the key is pressed, and the tactile structure still generates the tactile feedback.

The device and the method disclosed in embodiments of the invention directly or indirectly notifies the output device of the switching event of the tactile mode and/or the sound mode of the input device, so the output device can correspondingly output an operation sound file or visual/haptic operation feedback according to the current tactile mode/sound mode of the input device. For the device configuration, it can be that: the input device is built with the output device, the input device is directly coupled to the output device, or the input device is coupled to the output device via a host. Moreover, in a quiet external environment, when the key of the input device is switched to the mute-on mode, the user can perceive the operation sound file or visual/haptic operation feedback corresponding to the first tactile mode through the near-ear device (such as a headphone) to achieve the provision of sound feedback and the maintenance of quiet environment. In addition, when the key of the input device is in the mute-on mode without generating the keystroke sound, in response to the switching of tactile mode of the key, the output device can output the operation sound file or visual/haptic operation feedback corresponding to different tactile modes, so as to satisfy the feedback demand of the user on different operation situations. Moreover, for the synchronous mode switching operation of multiple keys, the operating portion of the switching unit can couple to all adjusting mechanisms and the switch member, so when the adjusting mechanism adjusts the tactile structure or the sound-generating structure, the switch member is also triggered to generate the switching signal, and the output device can output different operation feedback after the mode switching.

DETAILED DESCRIPTION OF THE PREFERRED EMBODIMENT

Figure 1:
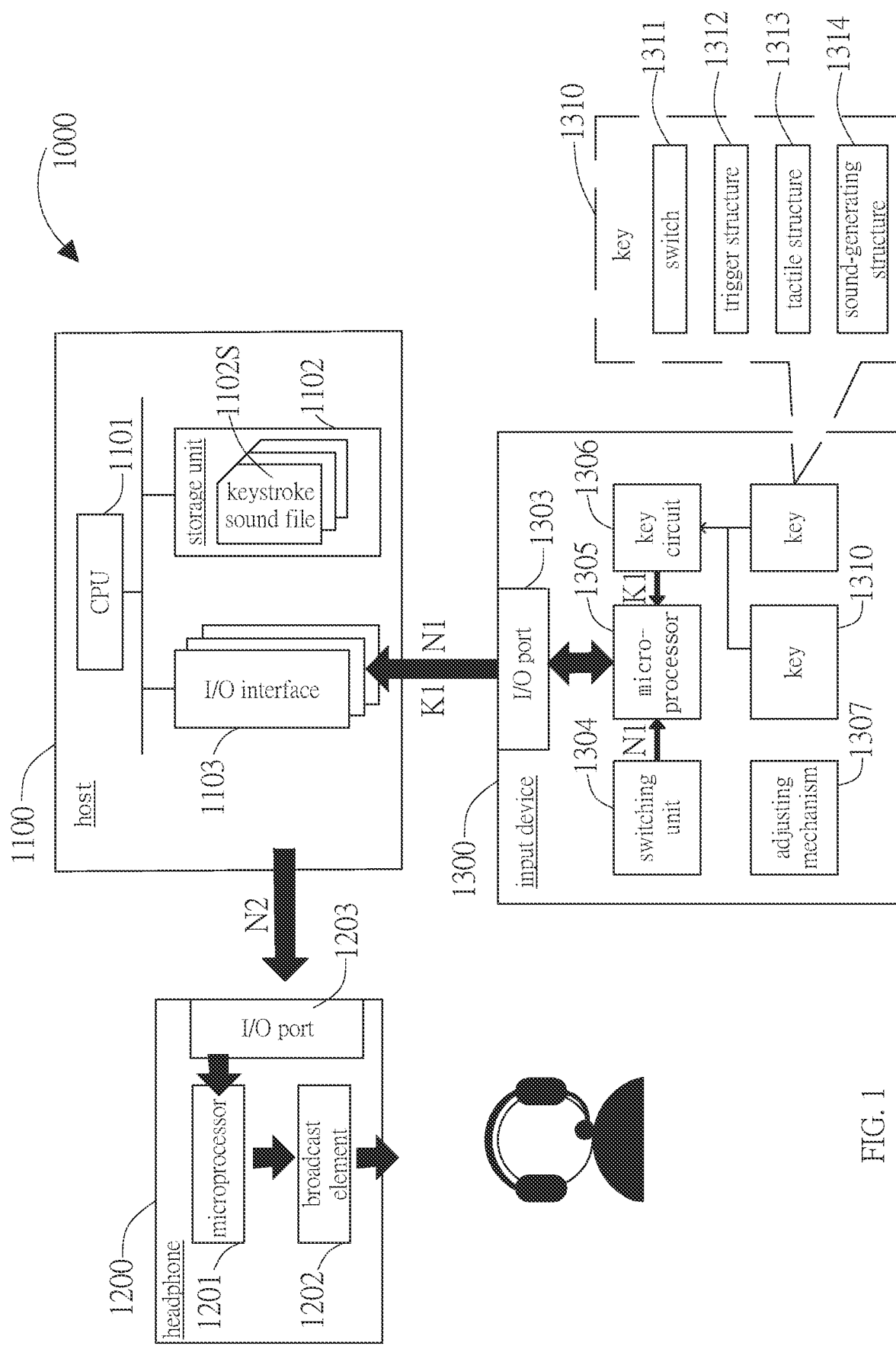
FIG. 1 is a schematic view of the feedback system in an embodiment of the invention.

Referring to FIG. 1, FIG. 1 is a schematic view of the feedback system 1000 in an embodiment of the invention. As shown in FIG. 1, the feedback system 1000 mainly includes an output device 1200 and an input device 1300, which are directly or indirectly coupled to each other in a wired or wireless manner. If necessary, the output device 1200 can indirectly couple to the input device 1300 via a host 1100. The output device 1200 and the input device 1300 can couple to the host 1100 in a wired or wireless manner.

The host 1100 can be an electronic device with the computing processing capability, such as a desktop computer, a laptop computer, a tablet, or a smart phone. The host 1100 can include a central processing unit (CPU) 1101, a storage unit 1102, and an input/output (I/O) interface 1103.

The storage unit 1102 is configured to store multiple keystroke sound files 1102S (operation sound files). The central processing unit 1101 is configured to control the output device 1200 to output a corresponding one of the keystroke sound files 1102S (operation sound files) according to the switching signal N1 generated by the input device 1300.

The output device 1200 mainly includes a microprocessor 1201, a broadcast element 1202, and an I/O port 1203. The output device 1200 can also store a portion of the operation sound files (e.g. the keystroke sound files 1102S (operation sound files) mentioned above) in its storage space.

The input device 1300 includes one or more keys 1310, a switching unit 1304, a microprocessor 1305, a key circuit 1306, and an adjusting mechanism 1307. The user-manually-operable switching unit 1304 and the key circuit 1306 are coupled to the microprocessor 1305. The key circuit 1306 is coupled to a plurality of switches 1311, and each switch 1311 can be triggered to generate an input signal K1 (e.g. alphanumeric signals or other input commands) in response to the pressing of a physical key (e.g. the key 1310). Each physical key 1310 mainly includes the switch 1311, a trigger structure 1312, a tactile structure 1313, and a sound-generating structure 1314. The specific structures and descriptions can be referred to the following embodiments. In a different embodiment, the switching unit 1304 can be physically connected to or pivotally coupled to the adjusting mechanism 1307, or can be indirectly electrically connected to the adjusting mechanism 1307. Accordingly, when the switching unit 1304 is actuated, the switching unit 1304 can directly move or indirectly drive the adjusting mechanism 1307 to adjust the tactile structure 1313 and/or the sound-generating structure 1314 of the key 1310. As such, the key 1310 can change the tactile feedback or switch the sound mode, i.e., mute-on or mute-off mode. The key 1310 moves along an operation path when being pressed, and the tactile structure 1313 and the sound-generating structure 1314 are generally an integral elastic member or multiple elastic members, which will interfere with the operation path when the key 1310 is pressed. Accordingly, by changing the positions of the tactile structure 1313 and the sound-generating structure 1314 relative to the operation path, the tactile feedback or the sound mode can be changed.

For example, the input device 1300 can be a mouse device or a keyboard device. The switching unit 1304 can adjust the tactile structure 1313 and/or the sound-generating structure 1314 of the key 1310 when switching, so the input device 1300 and the keys 1310 thereof can be switched between a first tactile mode and a second tactile mode or between the mute-on mode and the mute-off mode. The sound-generating structure 1314 and the tactile structure 1313 can be selectively operated independently, so the tactile mode and the sound mode of the key 1310 can be switched synchronously or independently. For example, the key 1310 can provide the tactile feedback under the mute-on mode, or no tactile feedback under the mute-on mode. In other embodiments, the switching of the tactile mode and the sound mode are linked together. For example, the first tactile mode is linked with the mute-off mode, so the key 1310 will provide an operation feedback of louder keystroke sound and higher pressing resistance or a clear tactile feedback of louder keystroke sound. In contrast, the second tactile mode is linked with the mute-on mode, so the key 1310 will provide an operation feedback of smaller or inaudible keystroke sound and lower pressing resistance or a quieter or inaudible linear feedback. When the key 1310 is in the second tactile mode, the volume of the physical keystroke sound is at least smaller than the volume of the physical keystroke sound in the first tactile mode. Moreover, in different embodiments, the key 1310 can be a longitudinal pressing type input member, a rotating type input member, or other type input member (e.g. traverse sliding type), which has the adjustable tactile structure and is suitable for the device and the method of the embodiments of the invention. In addition, the keys in the embodiments are not limited to traditional keyswitches or buttons. The keys in the embodiments and the claims generally refer to the elements on the input device which are configured to be operated to generate the input signal by the user. The input signal can be generated through a pressing operation (e.g. on the keys of the keyboard) or a scrolling operation (e.g. on the roller of the mouse). A wheel-shaped button such as the mouse roller can generate not only the input signal through the scrolling operation to scroll the page in a browsing operation, but also the input signal through the pressing operation (on the middle button of the mouse). Therefore, the aforementioned operation sound files or keystroke sound files can be pre-recorded or simulated keyswitch click sounds, mouse roller scrolling sounds in ratchet and free spin modes, click sounds of pressing the mouse right/left/middle buttons. These operation sounds will have different timbres and characteristics due to different internal components of the key (e.g. mechanical plunger, microswitch, scissors-like support, butterfly support, with/without metal balance bar, support frame material), different tactile structures or sound-generating structures, and different materials.

The switching unit 1304 includes a pressable button or rotatable button and is adapted to drive the adjusting mechanism 1307 in response to a switching operation, so the input device 1300 and the keys 1310 thereof are switched between the first tactile mode and the second tactile mode and/or between the mute-on mode and the mute-off mode. When the switching unit 1304 generates the switching signal N1, the adjusting mechanism 1307 can be electrically controlled by the microprocessor 1305 according to the switching signal N1. Alternatively, the switching unit 1304 can be physically connected to the adjusting mechanism 1307 to physically drive the adjusting mechanism 1307. For the host 1100 and the output device 1200, the switching signal N1 involves the mode switching of the key 1310 between different operation feedback modes, such as the mode switching between different tactile modes or between different sound modes (e.g. mute-on, mute-off, different operation sounds).

In one aspect, the invention aims to realize that the user can listen the corresponding tapping sound of pressing the keys of keyboard/mouse without disturbing people in the neighborhood. In the following embodiments, the near-ear device (e.g. the sound conduction or bone conduction headphone) is used as the example of the output device 1200, but not limited thereto. In a specific application, the output device 1200 can be other types of audio devices, such as wired or wireless speaker (e.g. Bluetooth speaker, Wi-Fi speaker), which can adjust the playback volume in response to the switching of tactile or sound mode.

Figure 2:
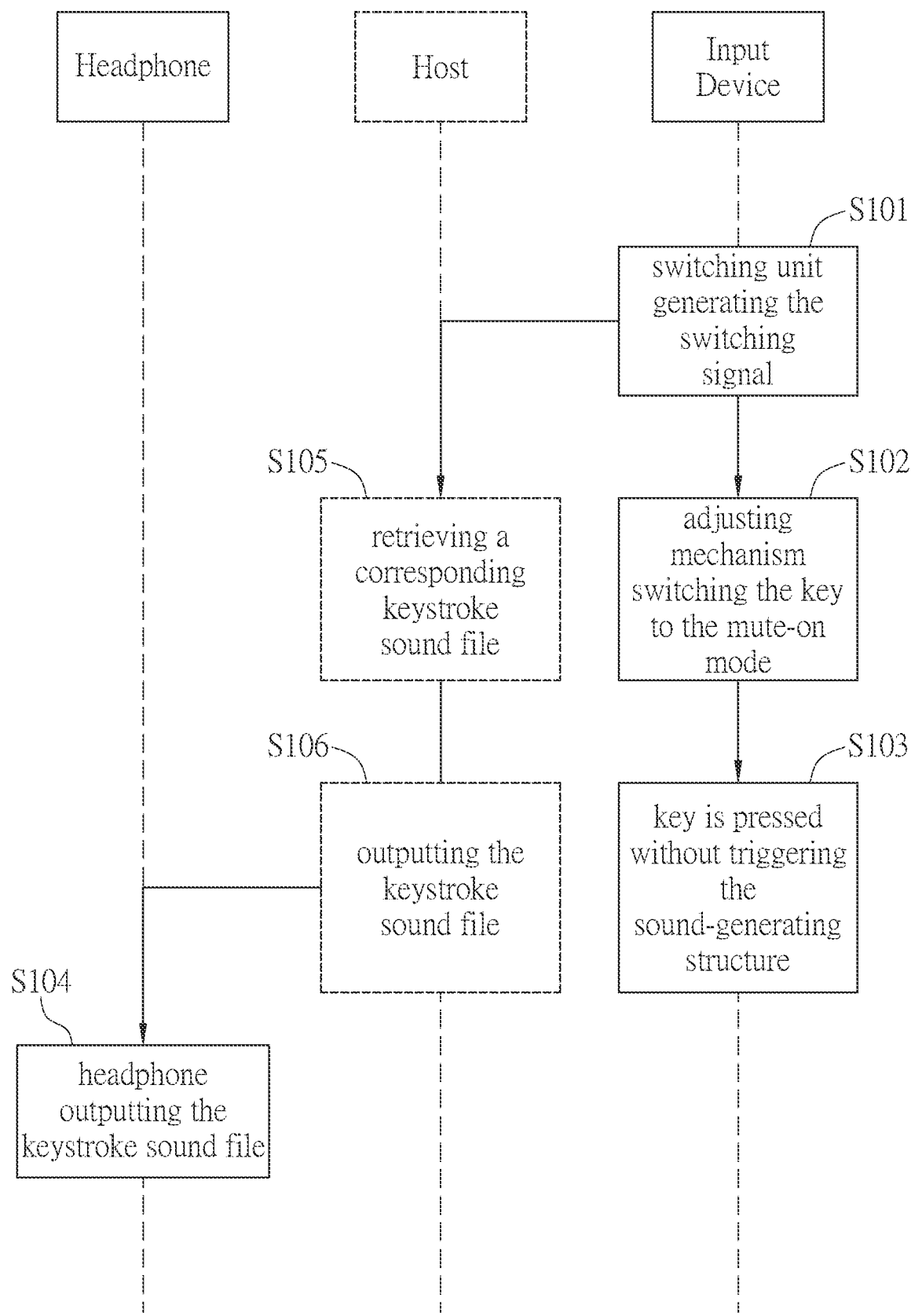
FIG. 2 is a flowchart of the input feedback method in an embodiment of the invention.

Referring to FIG. 2, a flowchart of the input feedback method in an embodiment of the invention is illustrated. In response to the mode switching of the input device 1300, the output device 1200 outputs a corresponding keystroke sound. The method of FIG. 2 can be performed by the feedback system 1000 of FIG. 1, and these steps are not necessarily performed according to the order shown in FIG. 2. FIG. 2 illustrates an embodiment that the switching of the tactile mode and the sound mode are not linked together. For example, only the sound mode is switched, and the tactile structure 1313 is normally in the first tactile mode to provide tactile feedback of a perceivable pressing resistance.

Step S101: the switching unit 1304 generates the (mute-on) switching signal N1 (e.g. switching to the mute-on mode). The switching unit 1304 can generate the (mute-on) switching signal N1 according to the operation of the user on the switching unit 1304.

Step S102: the adjusting mechanism 1307 enables the key 1310 to be switched to the mute-on mode. When the switching unit 1304 generates the (mute-on) switching signal N1, the switching unit 1304 can optionally drive the adjusting mechanism 1307 at the same, so the sound-generating structure 1314 of the key 1310 enters the mute-on mode from the mute-off mode. Since the adjusting mechanism 1307 does not adjust the tactile structure 1313, the key 1310 is in the low noise or no noise state and provides tactile feedback of perceivable (larger) pressing resistance (e.g. the first tactile mode) or linear feedback/tactile feedback of smaller pressing resistance (e.g. the second tactile mode), so that the user can be provided with different operation feedback of different pressing resistances on the finger. The switching unit 1304 can drive the adjusting mechanism 1307 in different ways including: electrically driving through an electric drive module, or mechanically driving by connecting the switching unit 1304 and the adjusting mechanism 1307 through any suitable linkage mechanism and transferring the force applied to the switching unit 1304 by the user to the adjusting mechanism 1307. After the switching signal N1 is generated, the structure of the input device can be changed, so the volume of the click sound generated when the user presses the key 1310 is changed, for example, from the first tactile mode to the second tactile mode or from the second tactile mode to the first tactile mode.

Step S103: when the key 1310 is pressed and triggered, the sound-generating structure 1314 is not triggered. When the user presses the key 1310, the key 1310 and the sound-generating structure 1314 thereof is in the mute-on mode, so the key 1310 is pressed without triggering and the sound-generating structure 1314. In response to the pressing of the key 1310, the input signal K1 is generated and transmitted to the host 1100.

Step S104: the keystroke sound file (operation sound file) corresponding to the mute-on mode is outputted by the headphone (the output device 1200). Since the key 1310 and the sound-generating structure 1314 thereof are in the mute-on mode, there is no mechanical click sound in the entire environment, and in response to the pressing of the key 1310 (and the generation of the input signal K1), the headphone (the output device 1200) can output the keystroke sound file (operation sound file) corresponding to the mute-on mode as the audible feedback to the user.

In some embodiments, the headphone (the output device 1200) is directly connected to the input device 1300 in a wired or wireless manner, such as directly connected to the headphone socket of the keyboard or mouse, or wireless connected to the headphone through the communication protocol such as Wi-Fi/Bluetooth/ZigBee/MQTT/CoAP without the host 1100. Accordingly, the headphone (the output device 1200) can directly receive the (mute-on) switching signal N1 and the input signal K1. Meanwhile, the headphone (the output device 1200) itself can store the keystroke sound files (operation sound files), so the headphone (the output device 1200) can directly receive the (mute-on) switching signal N1 and output the keystroke sound file corresponding to the mute-on mode in response to the pressing of the key 1310 (and the generation of the input signal K1). In FIGS. 1 and 2, the headphone (the output device 1200) can indirectly couple to the input device 1300 via the host 1100, so the method further includes:

Step S105, in response to the (mute-on) switching signal N1 and the input signal K1, the corresponding keystroke sound file 1102S is retrieved. The (mute-on) switching signal N1 generated by the switching unit 1304 is transmitted to the microprocessor 1305, and the microprocessor 1305 can transmit the same or corresponding signal to the host 1100 based on the switching signal N1, so the host 1100 will change the status settings of the input device 1300 to the mute-on mode. After the key 1310 is pressed to trigger the switch 1311, and the input signal K1 is transmitted to the host 1100 via the key circuit 1306 and the microprocessor 1305, the central processing unit 1101 of the host 1100 can control and retrieve the corresponding keystroke sound file 1102S in the storage unit 1102, wherein the keystroke sound file 1102S corresponds to the input signal K1 and the (mute-on) switching signal N1 (i.e., corresponding to the first tactile mode).

Step S106: the corresponding keystroke sound file is outputted to the output device 1200. The audible signal N2 (the encoded keystroke sound file 1102S) is transmitted to the output device 1200 through the I/O interface 1103 and the I/O port 1203. Finally, in the aforementioned step S104, the keystroke sound file is played by the broadcast element 1202 of the near-ear device (the headphone) (the output device 1200); therefore, even though no mechanical sound is generated, the sound feedback can be provided to the user as the mode switching of the key 1310 is actuated.

Figure 3:
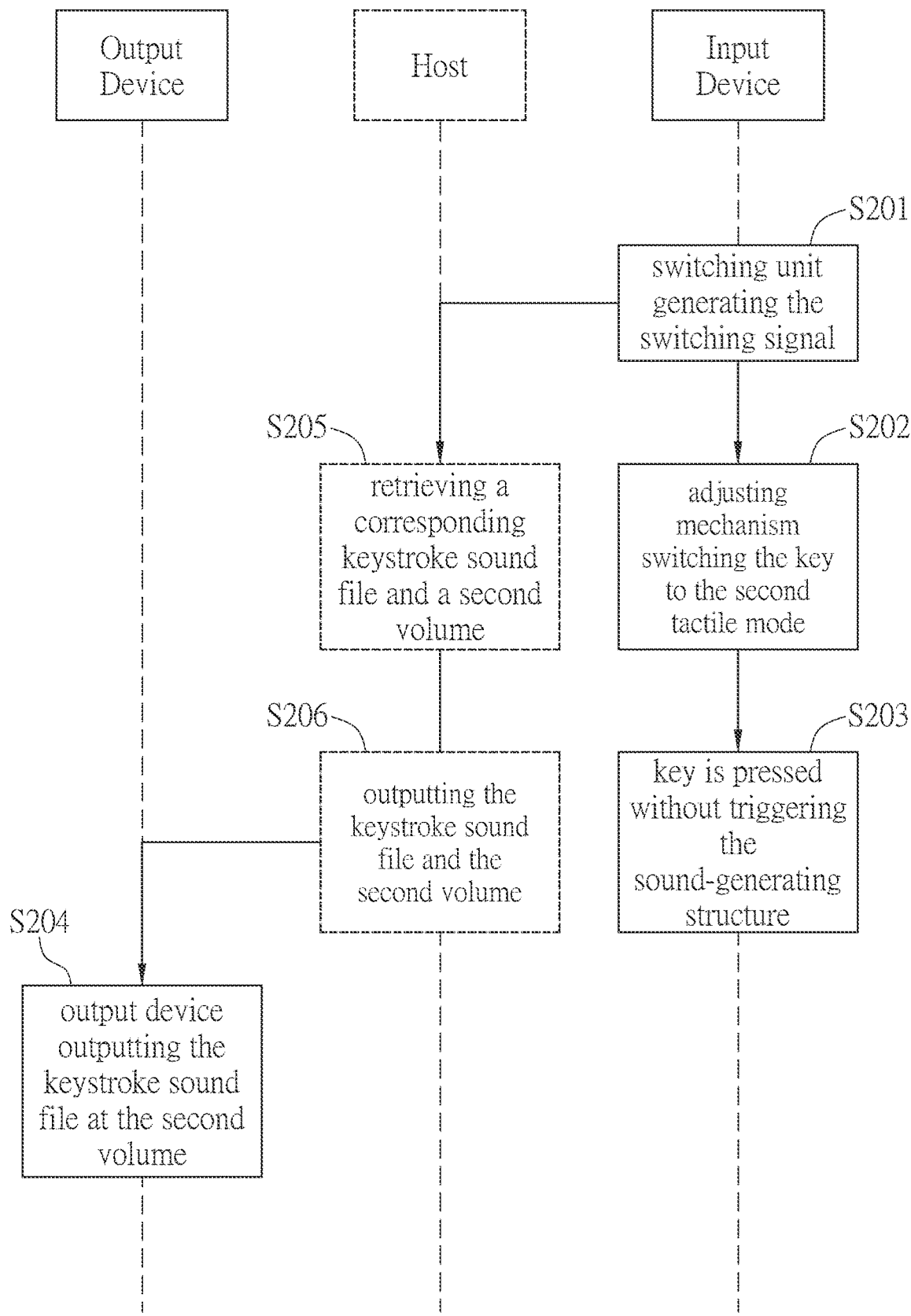
FIG. 3 is a flowchart of the input feedback method in another embodiment of the invention.

Referring to FIG. 3, a flowchart of the input feedback method in another embodiment of the invention is illustrated. The method shown in FIG. 3 can be performed by the feedback system 1000 of FIG. 1; however, these steps are not necessarily performed according to the order shown in FIG. 3. FIG. 3 also illustrates an embodiment that the switching of the tactile feedback and the sound mode are not linked together, and the sound mode is not switched. For example, the tactile mode is switched from the first tactile mode to the second tactile mode, and the sound-generating structure does not interfere with the operation path of the key 1310, so that the sound mode is maintained in the mute-on mode before and after the switching of the tactile mode. Moreover, in the first tactile mode, the tactile structure 1313 of the key 1310 provides the tactile feedback of higher pressing resistance or clear tactile feedback, and the corresponding (first) keystroke sound file can be played at a default or on-demand first volume. In the second tactile mode, the tactile structure 1313 provides the tactile feedback of lower pressing resistance or linear feedback, and the corresponding (second) keystroke sound file can be played at a default or on-demand second volume.

Step S201: the switching unit 1304 generates the (tactile) switching signal N1. The generation of the switching signal N1 means that all or partial of the keys 1310 of the input device 1300 is switched from the first tactile mode to the second tactile mode, and the keys 1310 and the sound-generating structures 1314 thereof are still in the mute-on mode.

Step S202: the adjusting mechanism 1307 enables the key 1310 to be switched to the second tactile mode. The switching unit 1304 can be physically connected to or electrically drive the adjusting mechanism 1307. For example, the microprocessor 1305 can judge the (tactile) switching signal N1 and electrically drive the motor to move the adjusting mechanism 1307. Alternatively, the switching unit 1304 can be physically connected to or pivotally coupled to the adjusting mechanism 1307, so when the switching unit 1304 is operated by the user, the adjusting mechanism 1307 is mechanically driven. Switching the key 1310 to the second tactile mode means that the tactile structure 1313 is adjusted by the adjusting mechanism 1307 to a configuration not interfere with the operation path of the key 1310, so the key 1310 provides tactile feedback of lower pressing resistance or linear feedback. The detailed descriptions will be explained in the following embodiments. In different embodiments, the adjustment of tactile modes is basically adjusting the interference ratio of the tactile structure 1313 to the operation path of the key 1310 by the adjusting mechanism 1307. When the interference ratio is higher, the pressing resistance is increased; when the interference ratio is lower, the pressing resistance is reduced. The tactile feedback of the key 1310 can be adjusted based on the provision with/without the escaping design of the tactile structure 1313. Similarly, by adjusting the interference ratio of the sound-generating structure 1314 to the operation path, the sound mode can be switched between the mute-on mode and the mute-off mode.

Step S203: the key 1310 is pressed and triggered without triggering the sound-generating structure 1314. When the user presses the key 1310, the key 1310 and the sound-generating structure 1314 thereof are in the mute-on mode, i.e., the sound-generating structure 1314 does not interfere with the operation path of the key 1310, so pressing the key 1310 will not enable the sound-generating structure 1314 to generate the click sound. Meanwhile, in response to the pressing of the key 1310, the input signal K1 is generated and transmitted to the host 1100.

Step S204: the output device 1200 plays the (second) keystroke sound file at the second volume. Since the key 1310 and the sound-generating structure 1314 thereof are in the mute-on mode, there is no mechanical click sound in the entire environment, and in response to the pressing of the key 1310 (and the generation of the input signal K1), the output device 1200 can play a corresponding (second) keystroke sound file as the audible feedback to the user. The volume of the corresponding (second) keystroke sound file played by the output device 1200 can be a default or on-demand second volume. The second volume corresponding to the second tactile mode can be selectively set by the user. Compared to the first volume in the first tactile mode, the second volume can be louder than the first volume. Since the tactile feedback in the second tactile mode is less significant (e.g. low pressing resistance or linear feedback), the louder second volume can provide a more significant audible feedback. In another embodiment, when the environment requires a quiet atmosphere, the second volume can be smaller or close to soundless. Before the switching signal N1 is generated, i.e., in the first tactile mode, the output device 1200 can play the first operation sound file in response to the input signal K1.

In some embodiments, the output device 1200 (e.g. the headphone or speaker) is directly connected to the input device 1300 in a wired or wireless manner without the host 1100. Accordingly, the output device 1200 can directly receive the switching signal N1 and the input signal K1. Meanwhile, the output device 1200 itself can store the (second) keystroke sound file, so the output device 1200 can directly receive the (tactile) switching signal N1 and play the corresponding (second) keystroke sound file at the second volume in response to the pressing of the key 1310 (and the generation of the input signal K1). In FIG. 3, the output device 1200 can indirectly couple to the input device 1300 via the host 1100, so the method of the embodiment further includes:

Step S205: in response to the (tactile) switching signal N1 and the input signal K1, the corresponding (second) keystroke sound file 1102S and the second volume are retrieved. The microprocessor can judge the (tactile) switching signal N1 generated by the switching unit 1304 and transmit a corresponding signal (or directly transfer the same) to the host 1100, so the host 1100 changes the status settings of the input device 1300 to be the second tactile mode (corresponding to the settings of the second volume).

Step S206: the (second) keystroke sound file and the second volume (setting) corresponding to the second tactile mode are outputted. After the key 1310 is pressed to trigger the switch 1311, and the input signal K1 is transmitted to the host 1100 via the key circuit 1306 and the microprocessor 1305, the central processing unit 1101 of the host 1100 can control and retrieve the corresponding (second) keystroke sound file 1102S and the second volume (settings) stored in the storage unit 1102, wherein the (second) keystroke sound file 1102S and the second volume (settings) correspond to the input signal K1 and the (tactile) switching signal N1 (i.e., corresponding to the second tactile mode), and then the audible signal N2 (the encoded (second) keystroke sound file 1102S) is transmitted to the output device 1200 through the I/O interface 1103 and the I/O port 1203. Finally, in the aforementioned step S204, after the (tactile) switching signal N1 is generated, the broadcast element 1202 of the near-ear device (the output device 1200) broadcasts in response to the generation of the input signal K1. Therefore, even though no mechanical sound (physical keystroke sound) is generated, in response to the tactile switching of the key 1310, the user can be provided with different audible feedback, and the near-ear device outputs the sound only to the specific user without disturbing the original quiet environment.

Moreover, in different embodiments, the method of FIG. 3 can be employed to switch from the first tactile mode to a third tactile mode. In the third tactile mode, the pressing resistance provided by the tactile structure 1313 exceeds that in the first tactile mode, or the force resistance curve during the keystroke will have different shapes of peak and valley. After the switching signal N1 is generated, the output device 1200 can output the third keystroke sound file at the corresponding third volume in response to the input signal K1.

Figure 4:
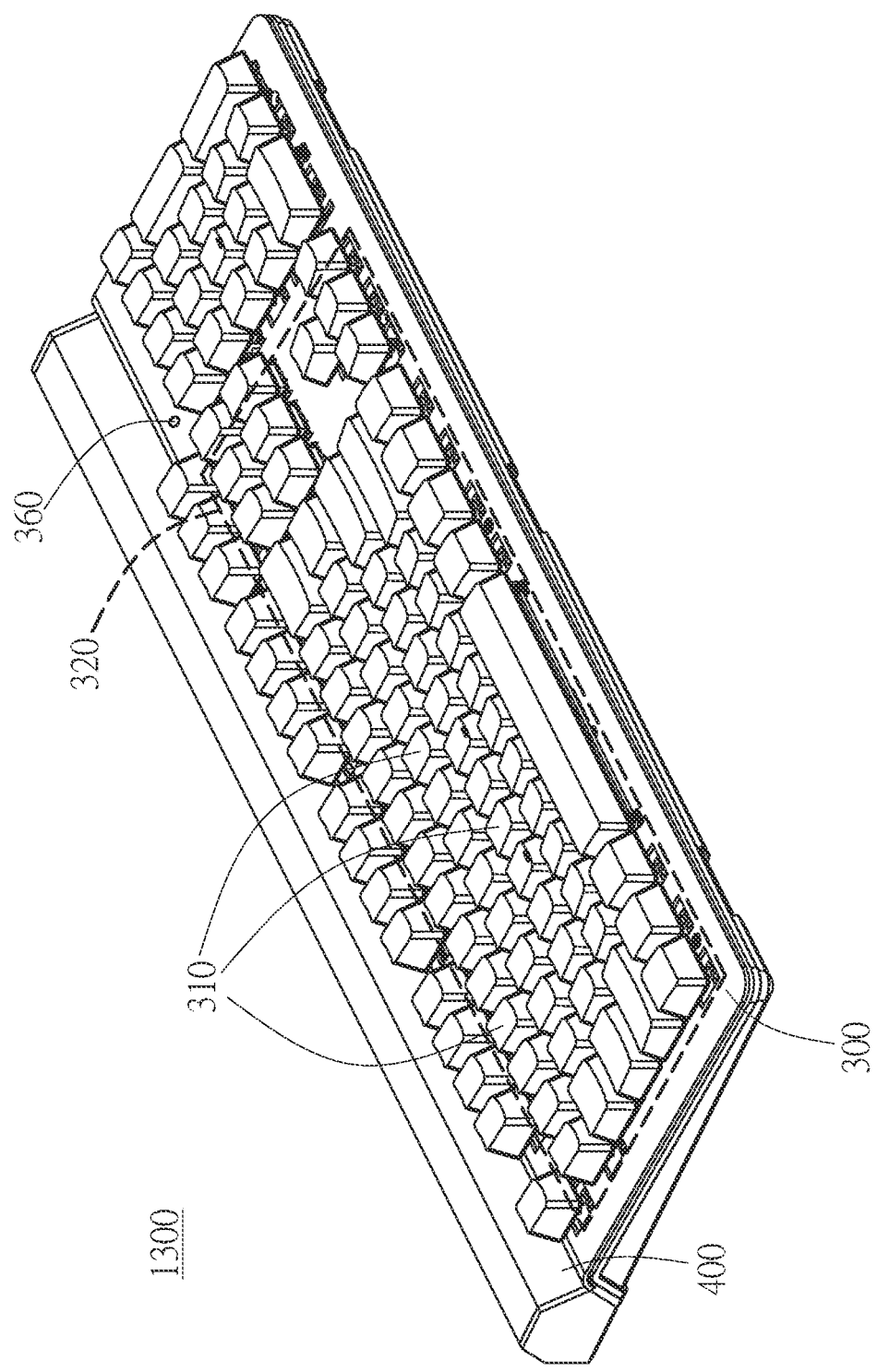
FIG. 4 is a schematic three-dimensional (3D) view of the input device in a further embodiment of the invention.

In the following embodiments, several methods associated with how the switching unit 1304 drives the adjusting mechanism 1307 or how the switching unit 1304 generates the switching signal N1 will be explained. FIG. 4 is an embodiment of an electric drive module 400. Please refer to FIG. 1 and FIG. 4. The input device 1300 of the invention is embodied as a keyboard. The input device 1300 includes a key module 300 and the electric drive module 400. The key module 300 includes keys 310 (corresponding to the keys 1310 in FIG. 1), a switching unit, a microprocessor, a key circuit, and an adjusting mechanism 320 (corresponding to the adjusting mechanism 1307 in FIG. 1). Except the keys 310 and the adjusting mechanism 320, the switching unit, the microprocessor, and the key circuit are not shown in FIG. 4. The adjusting mechanism 320 in this embodiment includes a plate body, which is disposed parallel to all or partial of the keys 310. The adjusting mechanism 320 can partially protrude or recess relative to each of the keys 310 so as to abut against the tactile structure or the sound-generating structure of the key 310. The electric drive module 400 is indirectly coupled to the microprocessor of FIG. 1. The electric drive module 400 can include a battery, a motor, and a transmission structure (not shown), wherein the transmission structure is physically connected to the motor and the adjusting mechanism 320. When the switching unit generates the switching signal N1, the microprocessor controls the torsion force outputted by the motor of the electric drive module 400 to drive the adjusting mechanism 320, so as to adjust the tactile structure or the sound-generating structure of the key 310, resulting in the switching of the tactile mode or the sound mode. The input device can further include an indicator 360, which is adapted to change the indicating status in response to the mode switching. For example, the indicator 360 can be a light device and change the indicating status by lighting or not lighting. In other embodiments, the indicator 360 can be implemented as an audible device, which generates audio signals in response to the mode switching to notify the user of the current tactile mode or sound mode.

Figure 5A:
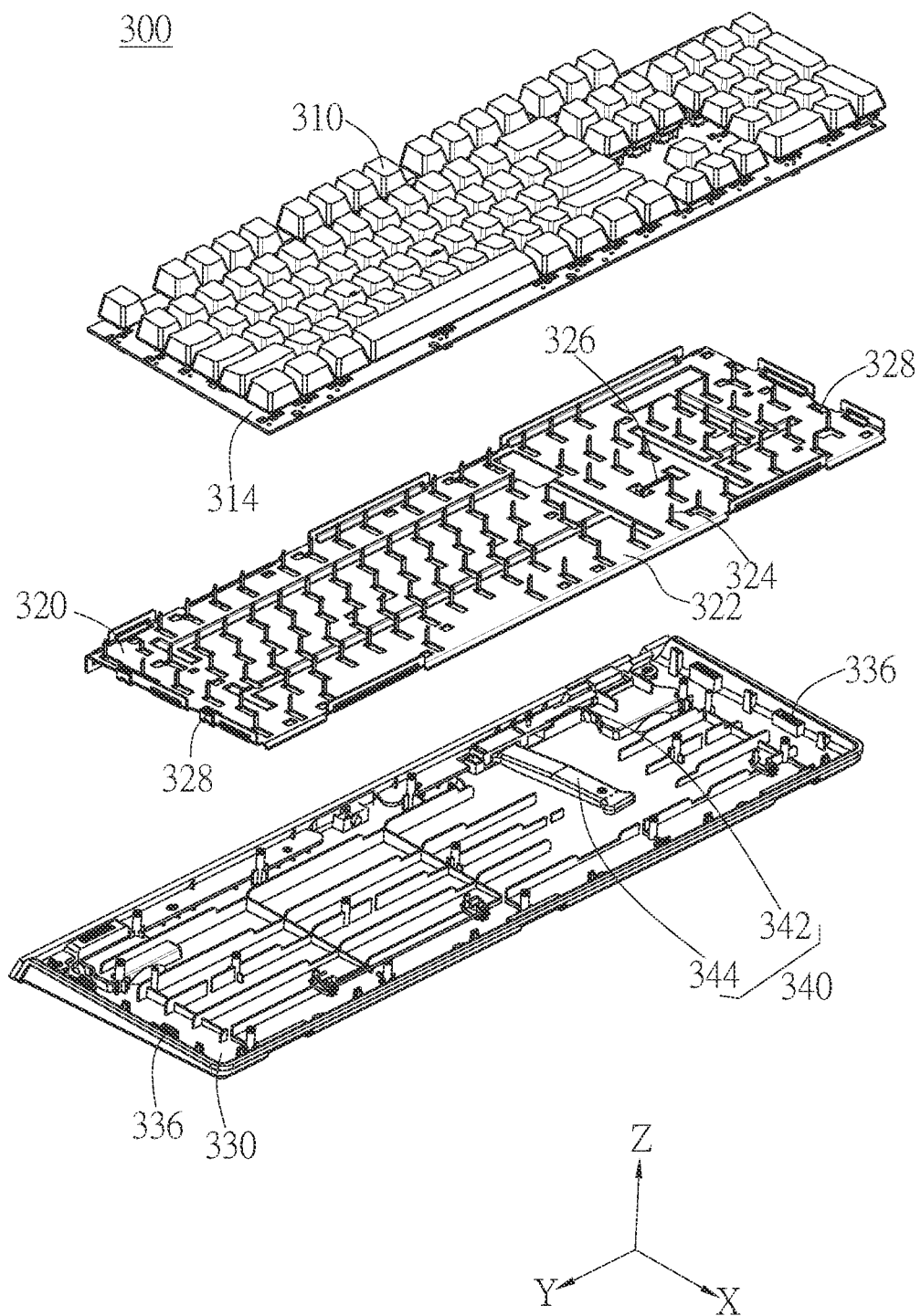
FIG. 5A is an exploded view of the keyboard module in an embodiment of the invention.

FIG. 5A is an exploded view of the key module 300 in an embodiment of the invention. The key module 300 mainly includes a plurality of keys 310, a key circuit 314 (i.e., a circuit board), an adjusting mechanism 320, and a switching unit (referring to 15A/15B in FIG. 5B/5C). The adjusting mechanism 320 includes an adjusting plate 322 and a linkage mechanism 340. The linkage mechanism 340 includes a first linking member 342 and a second linking member 344. The linkage mechanism 340 is pivotally coupled to the adjusting plate 320 and the housing 330. The linkage mechanism 340 drives the adjusting plate 320 to move along a certain direction relative to the keys 310 when receiving a force. The adjusting plate 322 has a plurality of adjusting portions 324 corresponding to the keys 310, respectively. Each of the keys 310 has the tactile structure and the sound-generating structure (e.g. a torsion spring, a leaf spring, a cantilever, or a linkage structure, which is elastically deformable). One or more of the adjusting portions 324 can movably abut against the tactile structure and/or the sound-generating structure, in response to the movement of the adjusting plate 320, to move the tactile structure and/or the sound-generating structure of the keys 310, so as to achieve the switching of tactile and/or sound mode. In FIG. 5A, the adjusting portion 324 is embodied as a long rod, which can extend into the key 310, but not limited thereto. In other embodiments, the adjusting portion 324 can be a short wing or a recessed structure. Alternatively, the key 310 may have a notch to expose a portion of the tactile structure and/or the sound-generating structure, or a portion of the tactile structure and/or the sound-generating structure can extend out of the key 310. The adjusting portion 324 can be configured to have any suitable configuration to abut against the tactile structure and/or the sound-generating structure. In this embodiment, the switching unit which generates the switching signal N1 (corresponding to the switching unit 1304 of FIG. 2) can be implemented by, for example, one or more specific keys 310 and a corresponding partial key circuit 314. The functional key code or combination key code generated by pressing the specific key(s) can be an example of the switching signal N1.

Figure 5B:
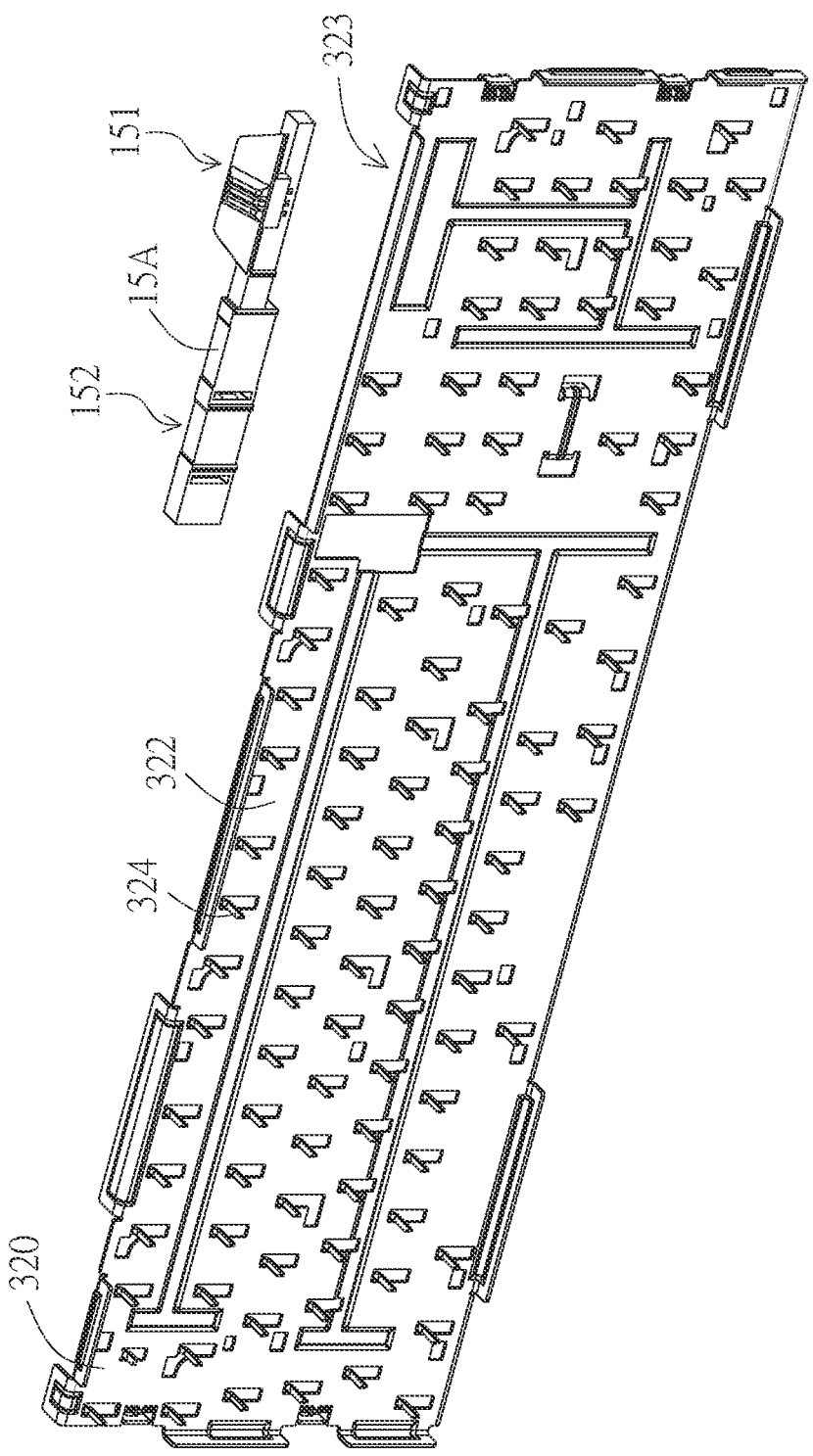
FIG. 5B is an exploded view of the switching unit and the adjusting mechanism in a variant embodiment of the invention.

The switching unit of the invention (e.g. the switching unit 1304 of FIG. 1) can be implemented with different configurations according to different embodiments. In general, the switching unit can include an operating portion operable by the user and a switch member adapted to generate the switching signal. When the switching unit is physically connected to the adjusting mechanism, a linking member or other coupling members can be disposed on the switching unit and the adjusting mechanism and connected therebetween, as later introduced in FIG. 5B. When the switching unit is not physically connected to the adjusting mechanism, the adjusting mechanism can be electrically driven as described in the embodiment of FIG. 4. FIG. 5B is an exploded view of the switching unit 15A and the adjusting mechanism 320 in a variant embodiment of the invention. In this embodiment, the switching unit 15A is physically connected to the adjusting mechanism 320. The switching unit 15A includes an operating portion 151, a linkage mechanism 152, and a switch member (not shown). The switching unit 15A is coupled to the adjusting plate 322 of the adjusting mechanism 320 via the linkage mechanism 152. The operating portion 151 has a shape of a rectangular block and is generally exposed on the outer surface of the keyboard (the input device). When the user linearly exerts force on the operating portion 151 of the switching unit 15A, through the linkage mechanism 152, the switching unit 15A can drive the adjusting mechanism 320 to move, so the adjusting portion 324 of the adjusting mechanism 320 can move the tactile structure and/or the sound-generating structure of the key 310 (shown in FIG. 4 and FIG. 5A) to switch the tactile or sound mode. Meanwhile, the movement of the switching unit 15A will trigger the switch member to generate the switching signal, so the host or the output device can recognize the changing of the tactile or sound mode to retrieve the keystroke sound file corresponding to the tactile or sound mode after switching and play it at a corresponding volume.

Figure 6A:
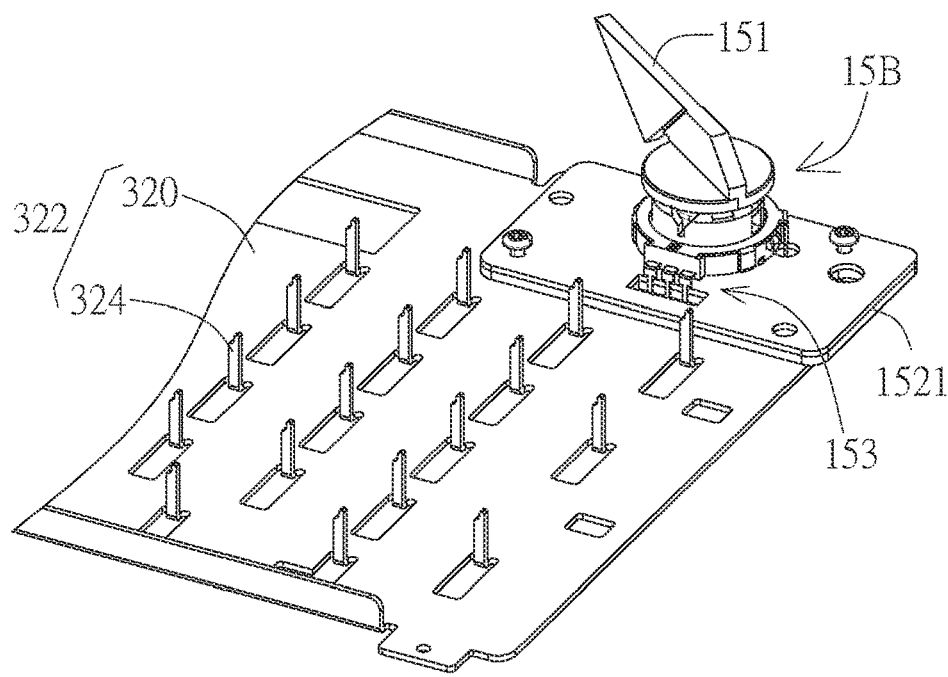
FIGS. 6A and 6B are a partial 3D top view and a partial 3D bottom view of the switching unit and the adjusting mechanism in another variant embodiment of the invention, respectively.
Figure 6B:
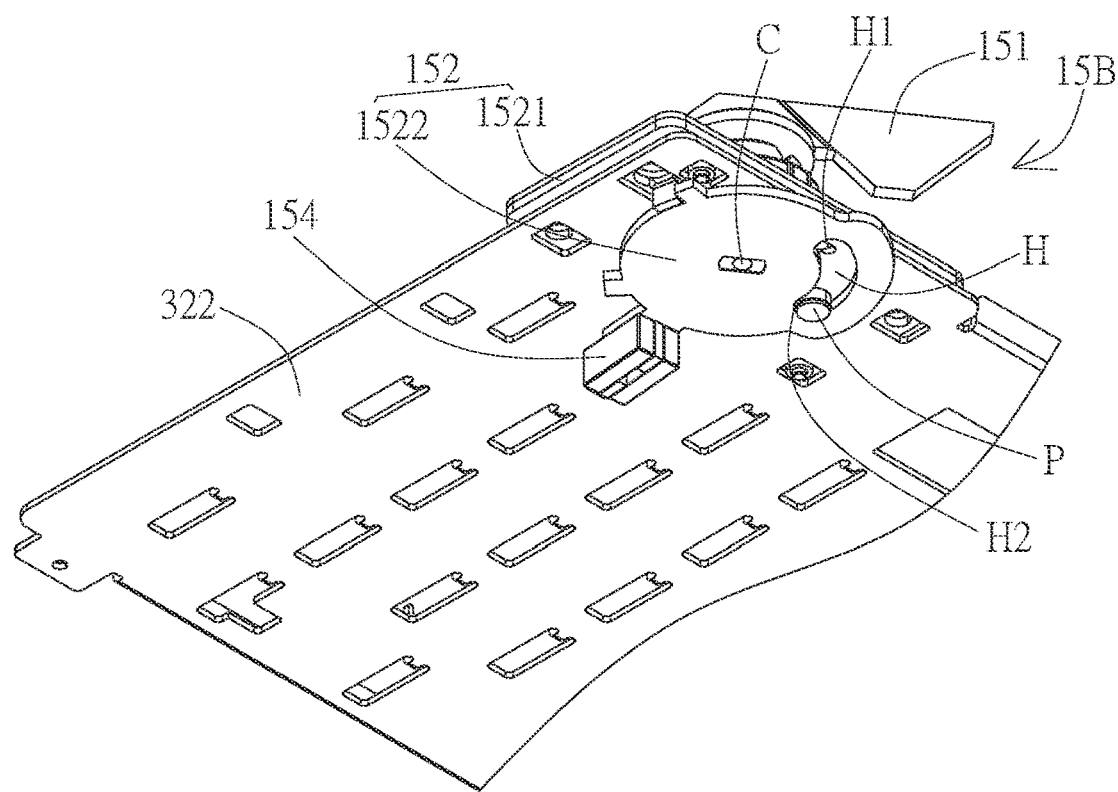

In practical applications, to move the tactile structures and/or the sound-generating structures of over one hundred keys on the keyboard (the input device) requires a pushing force of several kilograms. To address this, the operating portion of the switching unit can be designed to have a turning knob form for saving force. FIGS. 6A and 6B are a partial 3D top view and a partial 3D bottom view of the switching unit 15B and the adjusting mechanism 320 in another variant embodiment of the invention, respectively. This embodiment is applicable to the keyboard type input device. The turning knob type switching unit 15B includes an operating portion 151, a linkage mechanism 152, and a switch member 153. The operating portion 151 can have a handle of a certain length. The longer length of the handle will generate a larger moment of force and save the user's force. The switching member 153 is a ring-shaped switch around the operating portion 151. The linkage mechanism 152 includes a base 1521 disposed on the upper surface of the adjusting plate 322 of the adjusting mechanism 320 and a connection piece 1522 disposed on the lower surface of the adjusting plate 322. The base 1521 is fixed on the housing (not shown), and the operating portion 151 is exposed outside the housing. The operating portion 151 is coupled to the connection piece 1522 through the rotation axle C, and the connection piece 1522 has an arch-shaped slot H. The base 1521 has a shaft P penetrating the adjusting plate 322 into the slot H. When the operating portion 151 receives a force to rotate toward a certain direction, the switch member 153 can generate the switching signal in response to the rotation of the operating portion 151, and the connection piece 1522 rotates with the operating portion 151 to drive the adjusting plate 322 to move by pushing one of the two ends H1/H2 of the slot H with the shaft P. Meanwhile, the adjusting portion 324 of the adjusting mechanism 320 can push the tactile structure and/or the sound-generating structure of the key 310 (shown in FIG. 4 and FIG. 5A) to switch the tactile or sound mode. Moreover, the input device can utilize magnets 154 to position the connection piece 1522 before and after the mode switching to ensure the structural stability in respective state and promote the positioning feedback when the user operates the switching unit 15B.

Figure 7A:
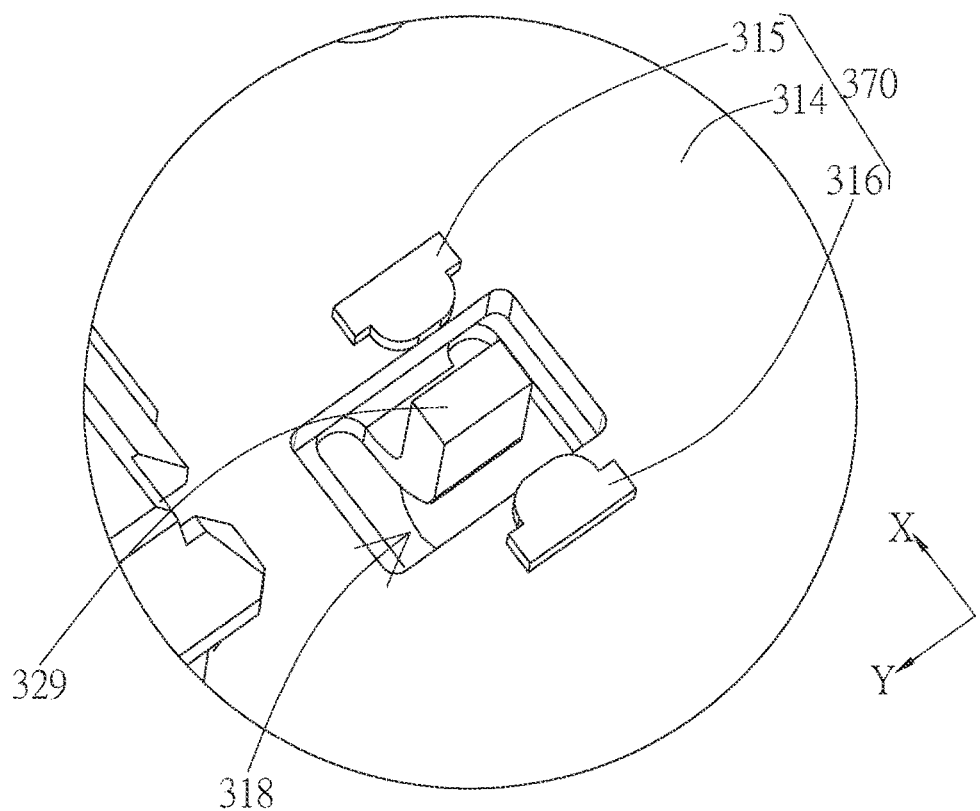
FIGS. 7A and 7B are partial 3D views of the switch member of the switching unit in yet another variant embodiment of the invention.
Figure 7B:
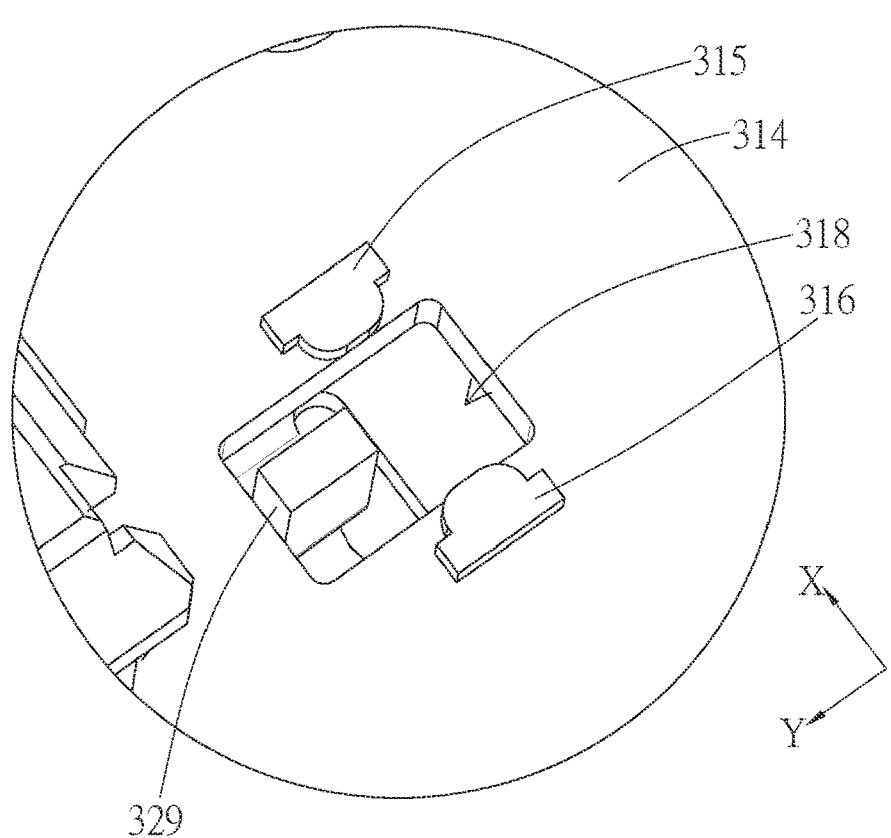

Regardless of keyboard, mouse or other input devices, the switch member of the switching unit which generates the switching signal N1 can be implemented in different manners, such as a switch of the key circuit (e.g. a single functional key or a combination of keys), a pair of conductive electrodes, a capacitive switch, an optical switch, a magnetic switch, piezoelectric switch, etc. FIGS. 7A and 7B are partial 3D views of the switch member of the switching unit in yet another variant embodiment of the invention. In this embodiment, the switching unit of the input device can include an operating portion (not shown), a linkage mechanism (not shown), and the switch member 370 in the form of an optical switch. The switch member 370 includes a pair of an emitter 315 and a receiver 316. The switching unit further includes a blocking piece 329 which moves in response to the switching operation of the switching unit. The blocking piece 329 can be located on the switching unit or the adjusting mechanism, such as on the adjusting plate 322 of the adjusting mechanism 320 of FIGS. 5A and 5B, or on the linkage mechanism 152 of the switching unit 15A of FIG. 5B, or on the connection piece 1522 of the linkage mechanism 152 of the switching unit 15B of FIG. 6B. In FIG. 7A, the blocking piece 329 moves, in response to the switching operation of the switching unit, to interpose between the emitter 315 and the receiver 316, so as to block the optical path and the optical signal. In FIG. 7B, the blocking piece 329 moves, in response to the switching operation of the switching unit, to avoid the optical path between the emitter 315 and the receiver 316, so as to allow the optical signal to be received by the receiver 316. The operation of blocking or non-blocking the optical path and the optical signal can be employed to generate the switching signal.

Figure 8:
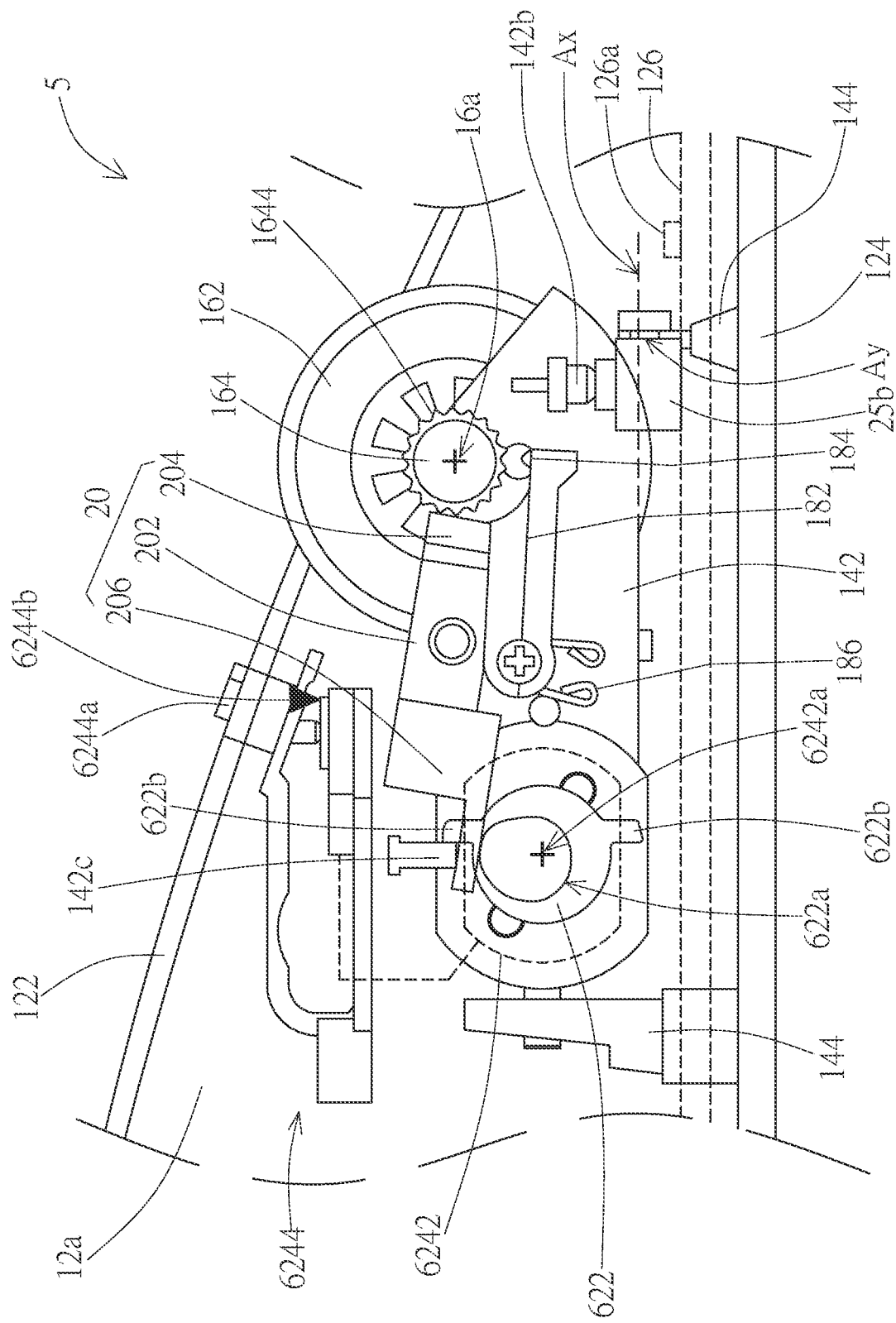
FIG. 8 is a schematic cross-sectional view of the input device in a variant embodiment of the invention.

Several embodiments with the mouse as the input device are provided below, which can realize the switching between high speed rotation and ratchet rotation of roller. FIG. 8 is a schematic cross-sectional view of the input device in a variant embodiment of the invention. The input device 5 is a mouse, and the roller 162 has a ratchet 164, which is co-axially arranged to rotate synchronously along the axial direction 16a. The rotation of the roller 162 will generate the input signal through the grating disc and the encoder (not shown). In this embodiment, the roller 162 can correspond to the key in the previous embodiment, and the ratchet 164 can correspond to the tactile structure and/or the sound-generating structure of the key. The input device 5 further includes a switching unit 6244, an electric drive module 6242 (e.g. motor and transmission element), and an adjusting mechanism 20. The switching unit 6244 includes an operating portion 6244a and a switch member 6244b. The operating portion 6244a is exposed on the surface of the housing 122. When the user presses the operating portion 6244a, the switch member 6244b is triggered to generate the switching signal to actuate the mode switching. Meanwhile, the electric drive module 6242 can drive the transmission arms 202/204/206 and the adjusting portion 182 of the adjusting mechanism 20 through the linkage mechanism 622, so that the bump 184 of the adjusting portion 182 can engage with or detach from the ratchet teeth 1644 of the ratchet 164 (the tactile structure) to achieve the switching of tactile/sound mode. When the bump 184 of the adjusting portion 182 is engaged with the teeth 1644 of the ratchet 164, the roller 162 produces the ratchet rotation as the bumps 184 alternatingly enters in/out the space between the ratchet teeth 1644 of the ratchet 164. When the bump 184 of the adjusting portion 182 is detached from the ratchet teeth 1644 of the ratchet 164, the roller 162 can rotate in high speed due to the greatly reduced rotation resistance. Adjusting the interference of the adjusting portion 182 with the ratchet 164 of the roller 162 corresponds to the adjustment of the interference with the rotation path (the operation path) of the roller 162. The output device 12a is a speaker, and the circuit board 126 of the input device 5 is disposed with a storage unit 126a, which is electrically connected to the output device 12a and can store a plurality of keystroke sound files and roller sound files (both are operation sound files). As such, with the omission of the host of FIGS. 1, 2 and 3, the output device 12a is built in the input device 5, and in response to the switching of roller tactile mode or the switching of key tactile mode, the built-in output device 12a can output the operation sound file (keystroke sound file or roller sound file), which corresponds to the current roller tactile mode or the key tactile mode and is played at a default or on-demand volume. The device configurations and the methods (including that the input device is built with the output device, and the output device plays the operation sound file corresponding to the current tactile mode or sound mode of the input device) can be applied to a mouse, a keyboard or other input devices.

Figure 9A:
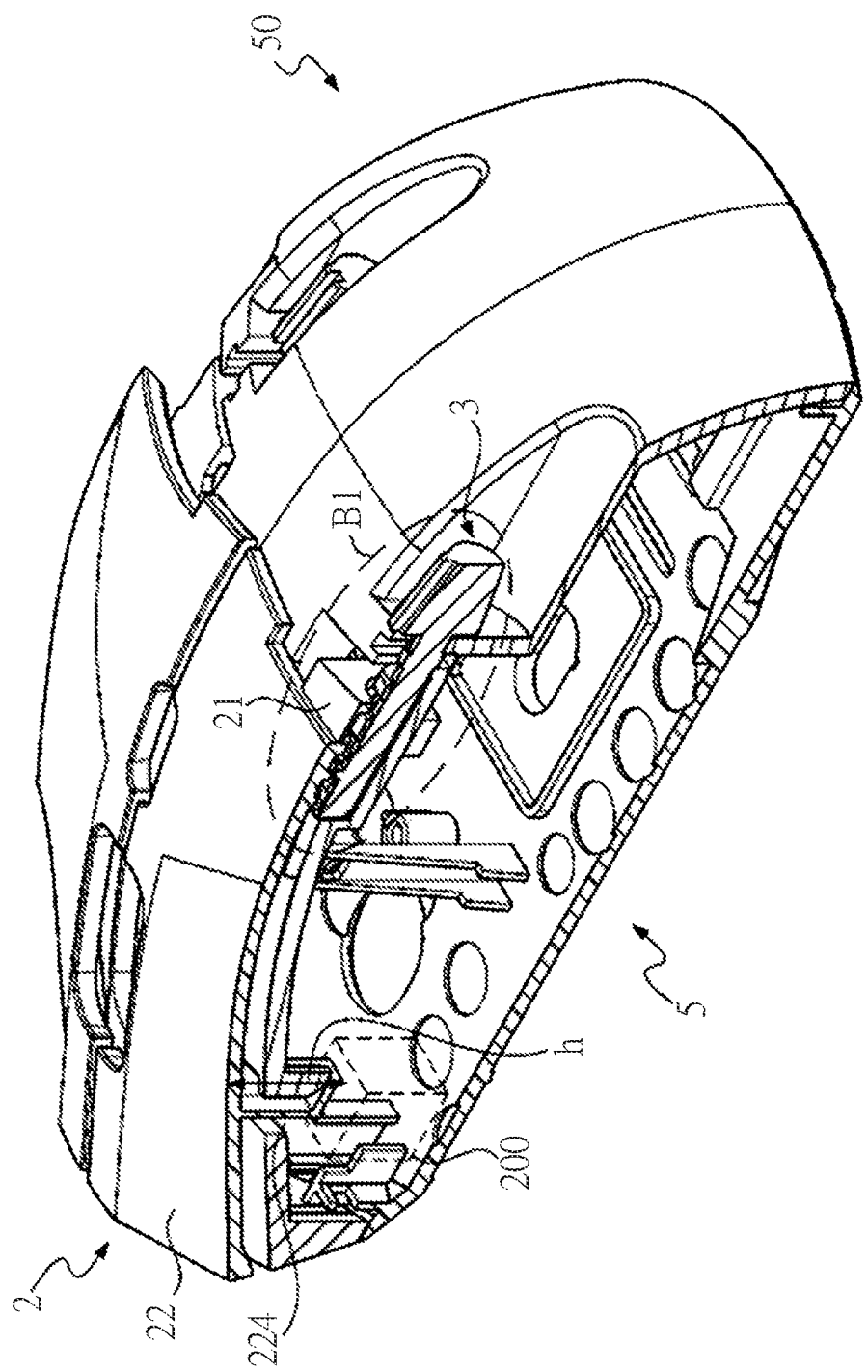
FIG. 9A is a partial 3D view of the input device in a derived embodiment of the invention.
Figure 9B:
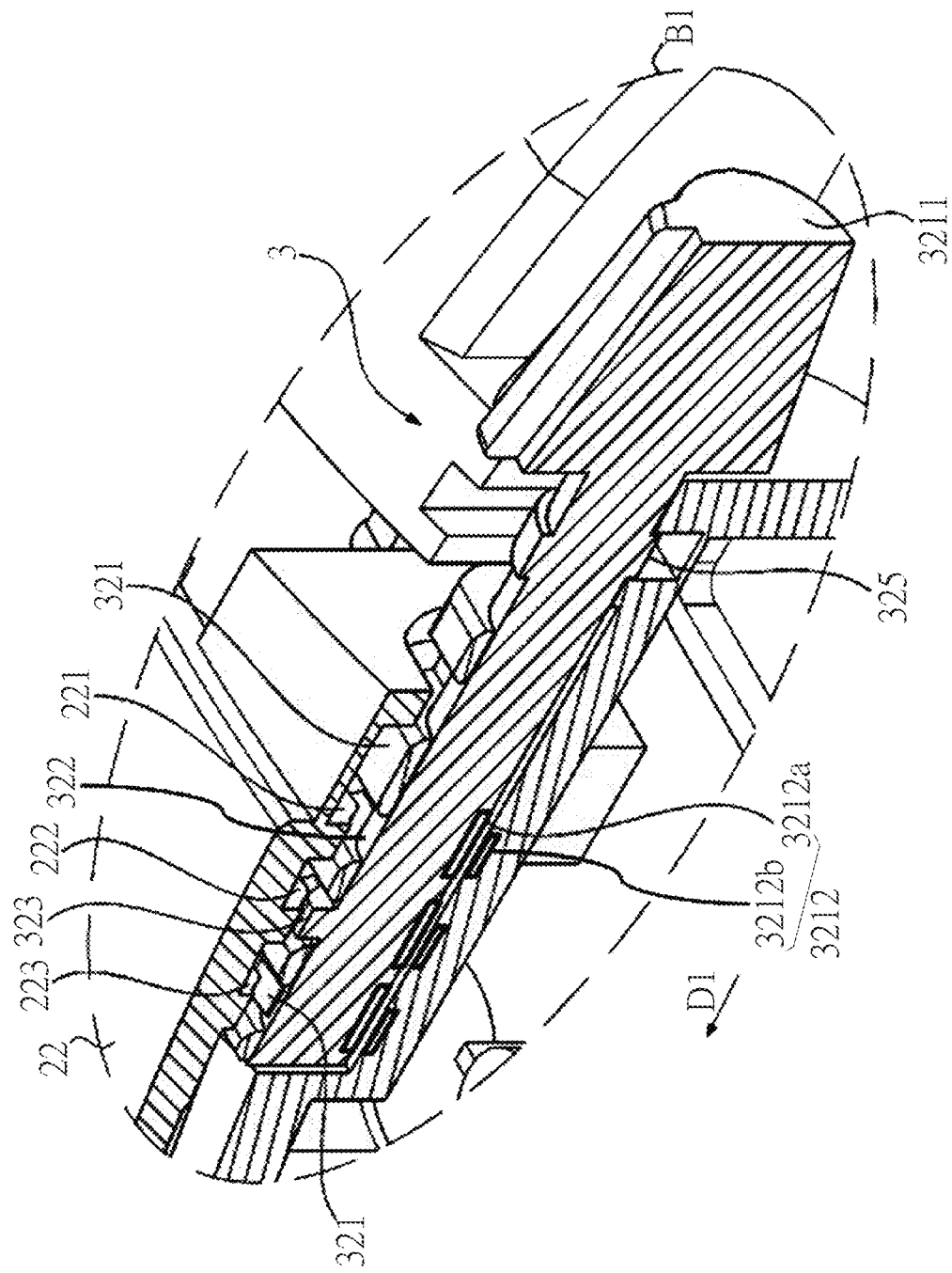
FIG. 9B is an enlarged view of the region B1 of FIG. 9A.

In addition, the tactile mode switching of mouse can be implemented on the tactile mode switching of the keys (left, right and middle keys). Specifically, the pressing resistance of the tactile feedback of the mouse key comes from the keys (the tactile/sound-generating structure is, for example, the torsion spring/leaf spring/compression spring, etc. between the key and the housing) over the mouse housing and the microswitch (the tactile/sound-generating structure is, for example, the torsion spring/leaf spring/compression spring, etc. inside the microswitch) on the circuit board. Accordingly, the mouse key or the microswitch can be disposed with the adjusting mechanism to switch the pressing resistance. Regarding the switching of the pressing resistance of the mouse key, please refer to FIGS. 9A and 9B. FIG. 9A is a partial 3D view of the input device in a derived embodiment of the invention; FIG. 9B is an enlarged view of the region B1 of FIG. 9A. The input device 5 is a mouse, and the key 2 can be movably coupled to the upper surface of the housing 50 of the input device 5. The switching unit 3 and the adjusting mechanisms 322/323/321 are at least partially located under the key 2. The pressing portion 224 of the pressable portion 22 of the key 2 extends downward to pass the housing 50 and to abut against the microswitch 200. Pressing the key 2 will trigger the microswitch 200 to generate the input signal. The switching unit 3 of the input device 5 can include an operating portion 3211 in a turning knob form with a tapered handle, a linkage mechanism 325 in a long rod form, and a plurality of switch members 3212. The plurality of adjusting mechanisms 322/323/321 are in the form of blocks and disposed on the linkage mechanism 325 at different locations and different angles, respectively. The operating portion 3211 of the switching unit 3 receives the force applied by the user to rotate, one of the plurality of adjusting mechanisms 322/323/321 will or will not abut against one of the blocks 221/222/223 on the lower surface of the key 2, so as to change the fulcrum of the key 2 and the operation distance h between the lower surface of the key 2 and the microswitch 200. The interference of the adjusting mechanisms 322/323/321 with the blocks 221/222/223 on the lower surface of the key 2 corresponds to the interference with the operation path of the key 2, which can change the tactile/operation feedback of the key 2. Moreover, when the switching unit 3 rotates, one of the switch members 3212 will be correspondingly triggered to generate the switching signal. Then, the output device will play the operation sound file corresponding to the current tactile mode/sound mode, which can be referred to FIGS. 1/2/3 and FIG. 8 and will not elaborate hereinafter.

Figure 10:
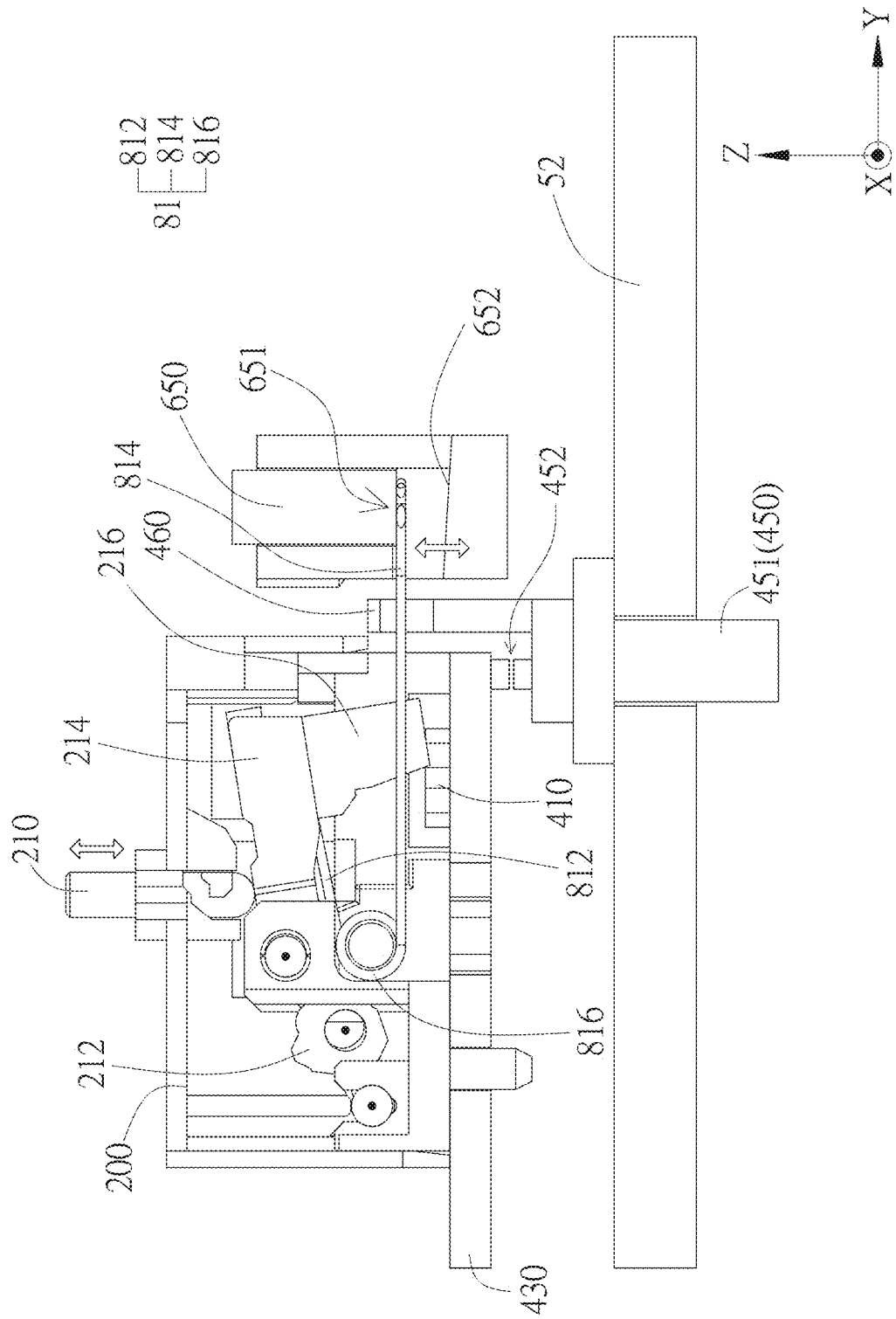
FIG. 10 is a schematic cross-sectional view of the key of the input device in a derived embodiment of the invention.

The switching of pressing resistance of the microswitch of the mouse to achieve the switching of tactile mode can be referred to FIG. 10, which is a schematic cross-sectional view a portion of the key (the microswitch 200) of the input device in a derived embodiment of the invention. The microswitch 200 includes a top post 210, a trigger structure (constituted by linking members 212/214/216), an optical switch 410, a tactile structure 81 (e.g. implemented by an elastic member, such as torsion spring or leaf spring), a switching unit 450, an adjusting mechanism 460, and a key circuit 430. When the top post 210 is pressed by the pressable portion 224 (FIG. 9A) under the key 2, the top post 210 will enable the linking members 212/214/216 of the rotatable trigger structure to rotate, so as to trigger the optical switch 410 on the key circuit 430 to generate the input signal. The upper end 812 of the tactile structure 81 abuts below the linking member 214 of the trigger structure and can move close to or away from the distal end 814 as the microswitch 200 is pressed by or released from the force. The distal end 814 of the tactile structure 81 extends to be located between a (first) surface 651 and a (second) surface 652, and the pivoting portion 816 is rotatably positioned inside the microswitch 200. The surfaces 651 and 652 can be two surfaces of any suitable structure inside the input device 5. When the user exerts the force on the operating portion 451 of the switching unit 450, which is exposed from the bottom surface of the housing 52, to enable the switching unit 450 and the entire adjusting mechanism 460 to move along the X direction, the adjusting mechanism 460 in the form of an upright hook having an inclined surface can push the distal end 814 of the tactile structure 81, and the distal end 814 is at least temporarily positioned on the surface 651 or the surface 652. When the distal end 814 of the tactile structure 81 is positioned on the surface 651, a larger pressing resistance is provided. When the distal end 814 is positioned on the surface 652, the tactile structure 81 provides a smaller pressing resistance to the linking members 212/214/216. Moreover, the switching unit 450 further includes a switch member 451. When the switching unit 450 moves back and forth along the X direction, the switch member 451 can generate the switching signals, respectively. Then, the output device can play the operation sound file corresponding to the current tactile mode/sound mode before or after the switching of the microswitch 200, which can be referred to FIGS. 1/2/3 and FIG. 8 and will not elaborate hereinafter. In addition, the tactile structure 81 can also be the sound-generating structure. For example, in the mute-off mode, the distal end 814 of the tactile structure 81 can deform and restore, in response to the movement of the linking members 212/214/216 of the trigger structure, so as to hit the surface 652 to generate the hitting sound. In the mute-on mode, the distal end 814 is positioned on the surface 652 and cannot hit the surface 652 to generate the hitting sound. Accordingly, the microswitch 200 of the mouse as the input device can have adjustable tactile and sound-generating structures for the switching of the tactile or sound mode, enabling the output device to play the operation sound file corresponding to the current mode of the microswitch 200. The tactile adjustment of the microswitch 200 can be implemented on the left key, the right key, and the middle key (pressing the roller) of the mouse, and can also be implemented on the mechanical keys adopting the microswitches 200 on the keyboard.

In the previous embodiments, the operation feedback of the key of the input device is described with the operation sound file, but the operation feedback of the invention is not limited to the audio output. The output device can output visible light or vibration to provide a visual or haptic operation feedback to the user. For example, the indicator of FIG. 4 can be one or more indicating lamps or vibrating elements (e.g. piezoelectric element or vibration motor). Accordingly, in response to the first/second/third operation sound modes of the previously mentioned different modes, the visual operation feedback can be achieved by outputting light signals of different colors/brightness/frequency/period/location/number/pattern. The haptic operation feedback can be achieved by outputting vibrations of different amplitude/frequency/period/location/number. Specifically, the haptic operation feedback can be used when the key is in the mode of providing tactile feedback, and can further be used when the tactile structure of the key is adjusted to provide the tactile feedback of small pressing resistance or the linear feedback. For example, when the tactile structure and the sound-generating structure are both disabled, and the key provides no physical sound feedback with insignificant tactile feedback or without tactile feedback, the user can still rely on the haptic operation feedback. In such a case, the output device can be, for example, directly connected to the input device (including built-in), and the vibrating element is preferably disposed on the input device, such as the housing of mouse or keyboard at a location, which is not necessarily to overlap the pressed keys, but any place that the fingers or palm of the user can receive the vibrations.

Figure 11:
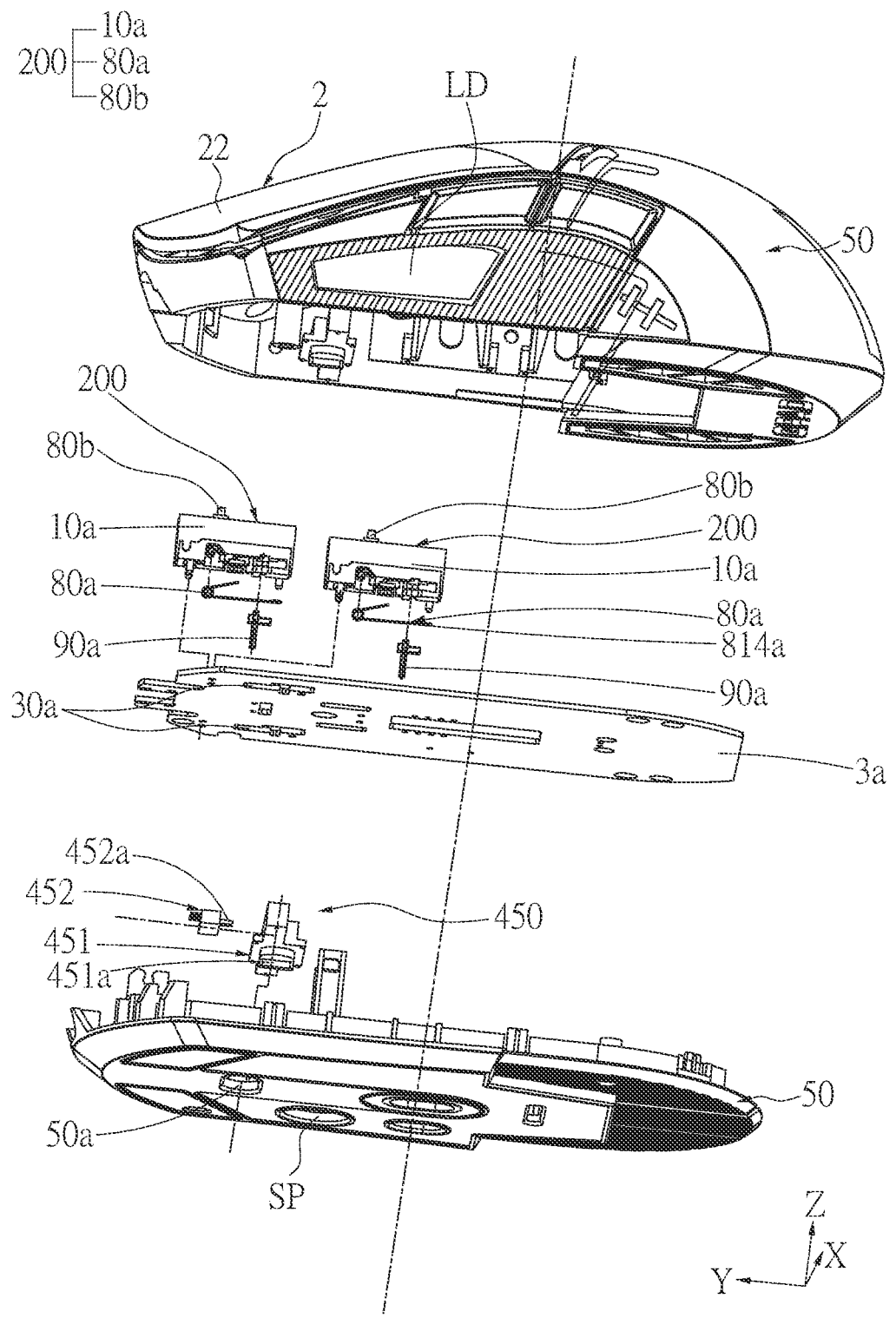
FIG. 11 is an exploded view of the input device in another variant embodiment.
Figure 12:
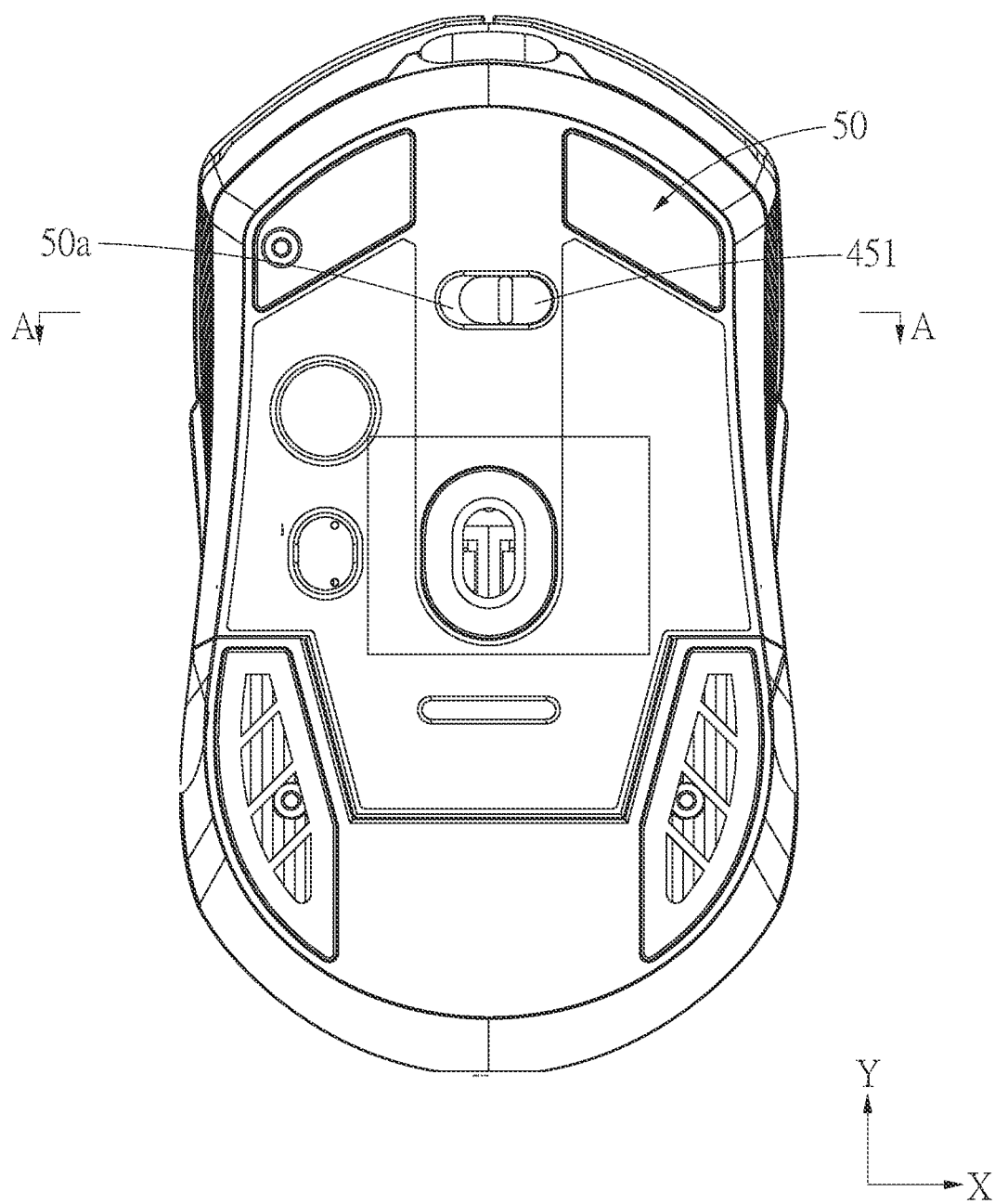
FIG. 12 is a schematic bottom view of the input device of FIG. 11.

Referring to FIGS. 11 and 12, the input device of the embodiment is implemented with the mouse configuration. The input device is electrically coupled to an output device, which is implemented as, for example, a speaker SP or a light device LD of FIGS. 11 and 12. The output device and the input device can be electrically connected through a cable or the printed circuitry on a printed circuit board 3a. For transmission of the operation feedback sound, the sound output surface of the speaker SP can be at least partially exposed on the outer surface of the input device or located in a hole or opening communicating with the external environment. When the speaker SP has a sufficient output power, the speaker SP can be entirely located inside the input device, and the audio wave will cause micro-vibrations of the surface of the input device, which can be considered as a kind of operation feedback to the user. Regarding the location of the light device LD, the light device LD should be located on the surface of the input device (particularly a region not covered by the palm or fingers of the user, such as the area between the thumb and the index finger) to facilitate the display of the feedback light. Moreover, the vibration motor or the piezoelectric element can be used with or replace the light device LD and/or the speaker SP to provide the haptic operation feedback.

As shown in FIGS. 11 and 12, the input device includes a plurality of keys 2 (e.g. left key/right key/middle key (roller) of the mouse), a switching unit 450, a plurality of adjusting mechanisms 90a, and a housing 50. Each key 2 includes a pressable portion 22 and a microswitch 200. The microswitch 200 includes a casing 10a, a sound-generating structure 80a, and a tactile structure 80b. The tactile structure 80b and the sound-generating structure 80a are located on the casing 10a. The pressable portion 22 extends downward a post (not shown), which penetrates into the housing 50 and abuts against the tactile structure 80b of the microswitch 200. When the pressable portion 22 is pressed by an external force, the external force is directly or indirectly transferred to the tactile structure 80b and/or the sound-generating structure 80a, for example, to drive the tactile structure 80b to move/rotate or to compress the sound-generating structure 80a. The casing 10a is disposed on the circuit board 3a, and the microswitch 200 further includes a signal switch OP (FIGS. 13A/13B/13C/13D) disposed on the circuit board 3a. In response to the movement of the tactile structure 80b, the signal switch OP can be triggered to generate the key signal. When the signal switch OP is an optical switch, triggering the signal switch OP generally refers that the movement of the tactile structure 80b is used to achieve the operation of blocking-avoiding or avoiding-blocking the optical path of the signal switch OP, so as to determine whether the signal switch OP is triggered based on the change of intensity of the optical signal.

Referring to FIGS. 11, 12, 13A and 13B, FIGS. 13A and 13B illustrate the operation of the tactile structure 80b in the mute-on mode. The tactile structure 80b in the casing 10a of the microswitch 200 includes a pressable rod 801 and a linkage member 802. The pressable rod 801 receives the force from the pressable portion 22 to move downward and press the linkage member 802. The L-shaped linkage member 802 has multiple segments coupled with each other through multiple pivotal connections (three pivotal connections in FIGS. 13A/13B). At least two pivots are fixed inside the casing 10a (e.g. two outer fixed pivots 802a shown in FIG. 13A/13B), and partial of the pivots is not fixed on the casing 10a (e.g. the middle pivot 802b shown in FIG. 13A/13B). When the pressable rod 801 presses the linkage member 802, the linkage member 802 rotates in a segmented manner. The linkage member 802 receives the force and enters to the state shown in FIG. 13B (the pressable portion 22 and the pressable rod 801 are at the lowest point) from the state shown in FIG. 13A (the pressable portion 22 and the pressable rod 801 are at the highest point). Because the total length of the pivotally connected segments of the linkage member 802 is larger than the distance between the fixed pivots (e.g. the two fixed pivots 802a of the linkage member 802 include a rhombus structure therebetween), the linkage member 802 will partially deform and restore to generate the keystroke feedback or the tactile feedback of the tactile structure 80b of the microswitch 200 during the pressing process.

Figure 13A:
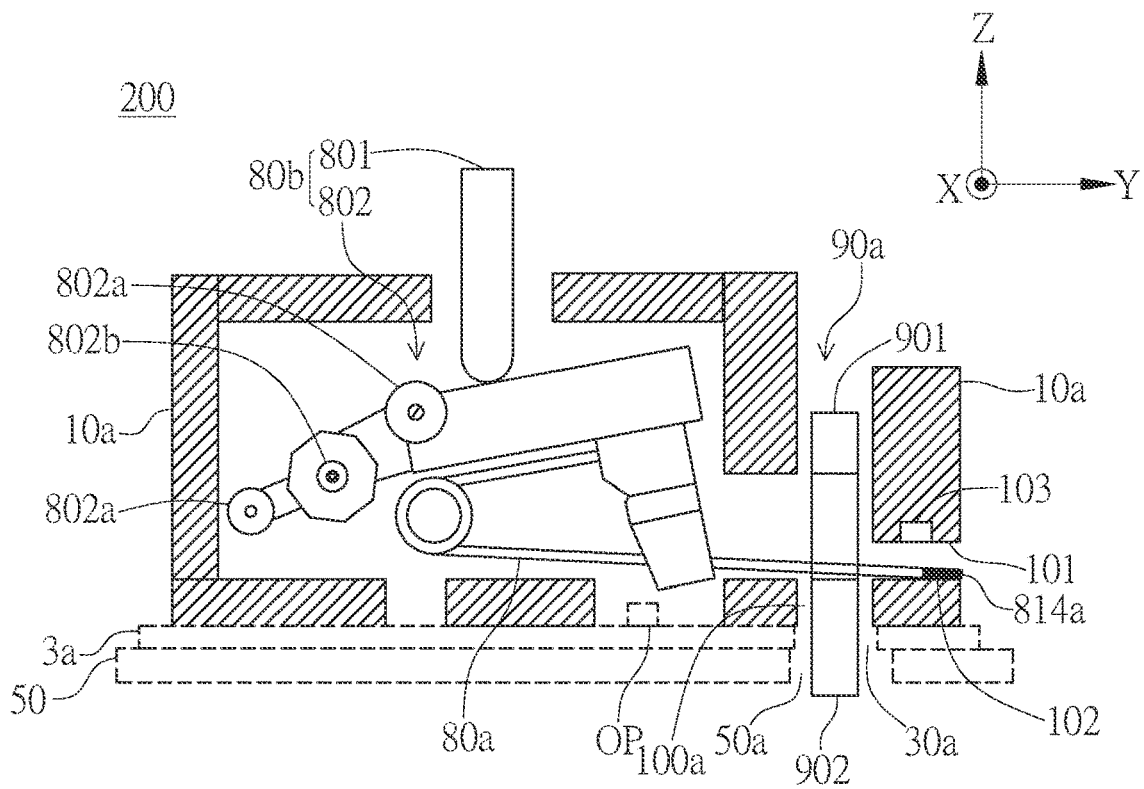
FIG. 13A is a schematic cross-sectional view of the microswitch of the input device of FIG. 11 in the mute-on mode (before being pressed).
Figure 13B:
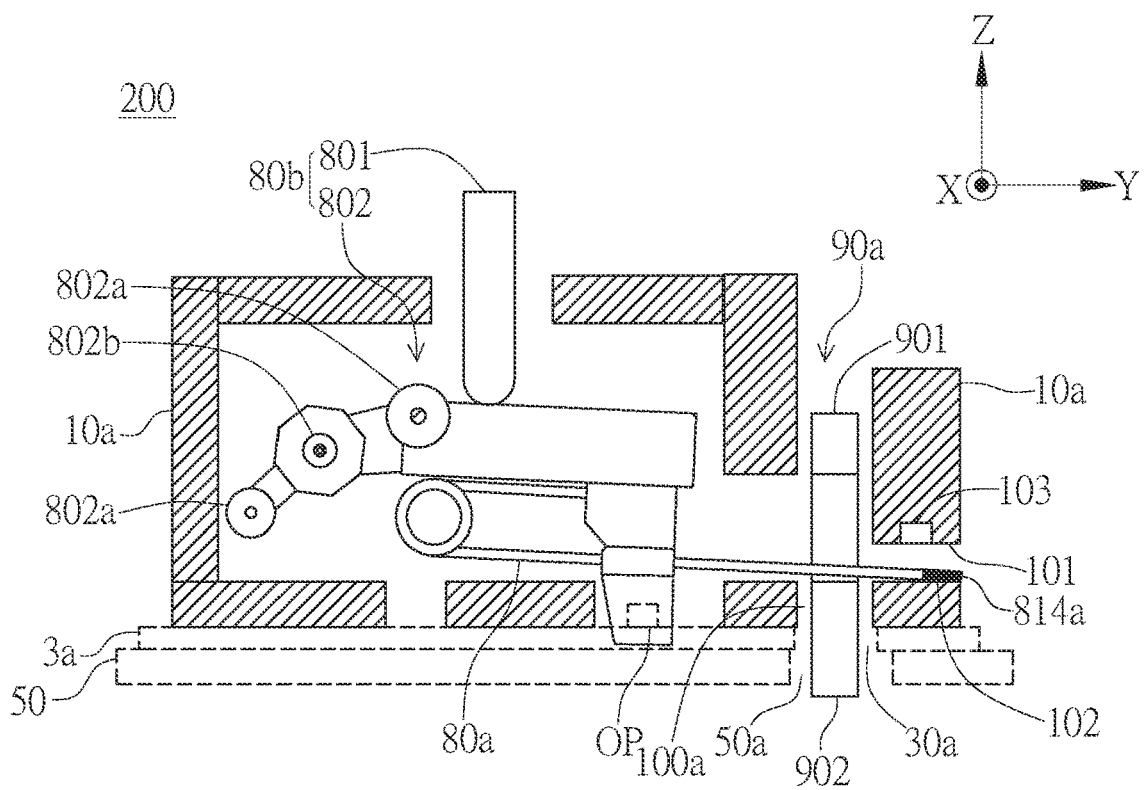
FIG. 13B is a schematic cross-sectional view of the microswitch of the input device of FIG. 11 in the mute-on mode (after being pressed).
Figure 13C:
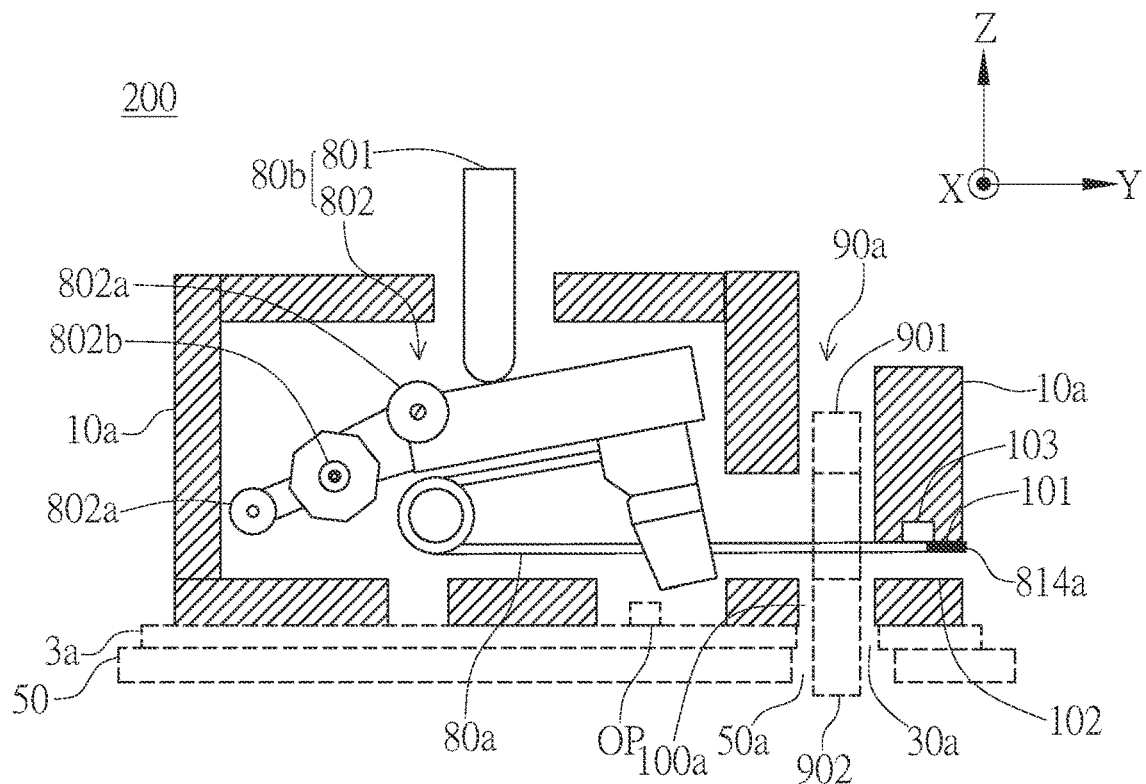
FIG. 13C is a schematic cross-sectional view of the microswitch of the input device of FIG. 11 in the mute-off mode (before being pressed).
Figure 13D:
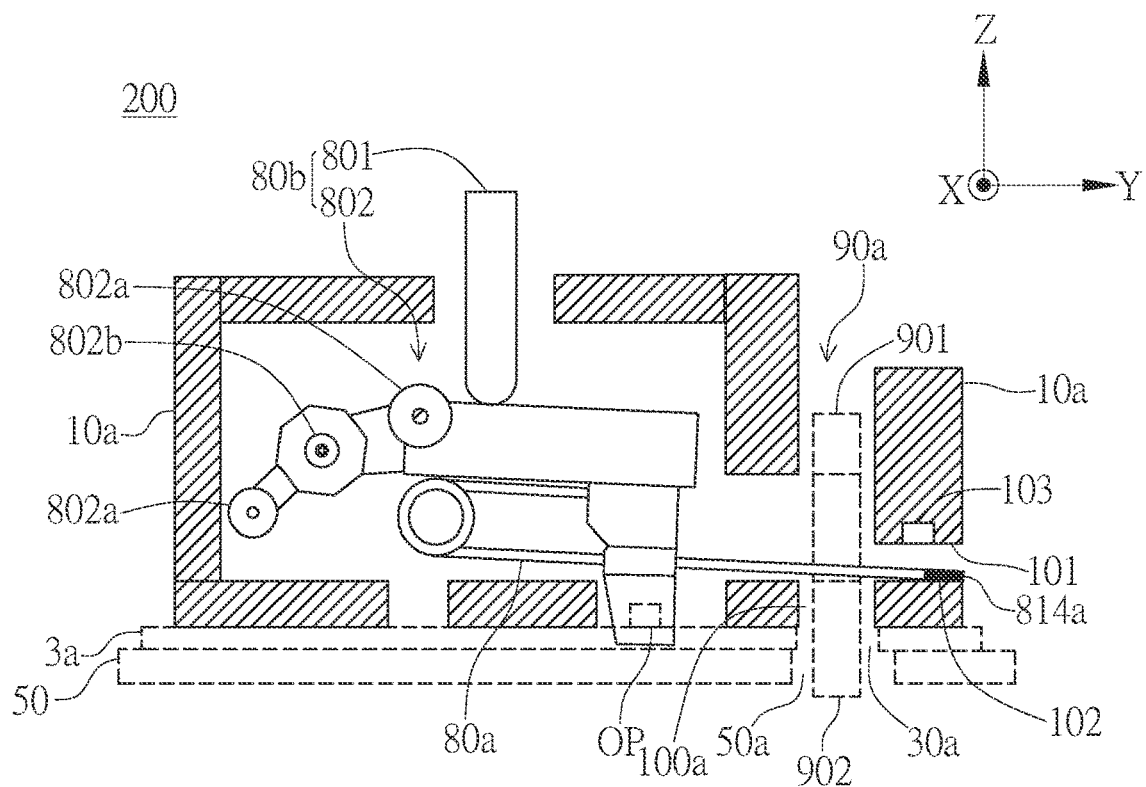
FIG. 13D is a schematic cross-sectional view of the microswitch of the input device of FIG. 11 in the mute-off mode (after being pressed).
Figure 17:
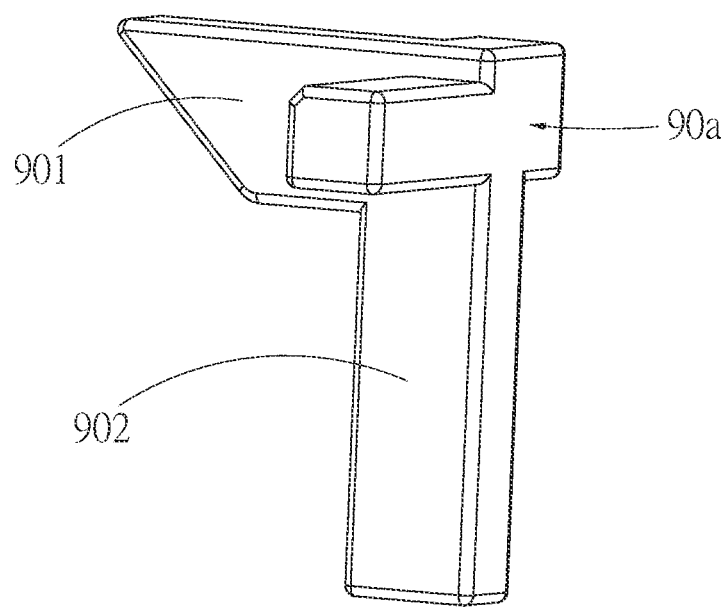
FIG. 17 is a 3D view of the adjusting mechanism in an embodiment of the invention.

In FIGS. 13A and 13B, the operation path of the sound-generating structure 80a is interfered and restricted by the adjusting mechanism 90a and cannot be operated normally, so the microswitch 200 is in the mute-on mode. When the key 2 is pressed, since the adjusting mechanism 90a does not interfere with the tactile structure 80b, the tactile structure 80b still remains to provide the tactile feedback, while the sound-generating structure 80a cannot be operated normally (cannot generate the hitting sound). Referring to FIG. 17, the adjusting mechanism 90a has an upper end 901 extending horizontally and a lower end 902 extending vertically. The upper end 901 has an inclined surface at its distal end portion. In this embodiment, the upper end 901 of the adjusting mechanism 90a corresponds to the adjusting portion in the previous embodiments. When the adjusting mechanism 90a moves toward a direction, the lower distal end with the hitting portion 814a of the sound-generating structure 80a is pressed by the inclined surface of the upper end 901 of the adjusting mechanism 90a and is finally confined on the surface 102 of the casing 10a, as shown in FIGS. 13A/13B. When the adjusting mechanism 90a moves in a reversed direction, the lower distal end with the hitting portion 814a of the sound-generating structure 80a also moves along the inclined surface of the upper end 901 of the adjusting mechanism 90a to be gradually released and is finally attracted by the magnet 103 to abut below the surface 101 of the casing 10a, as shown in FIG. 13C. For example, the sound-generating structure 80a can be implemented as a torsion spring or a leaf spring to provide the key 2 with a given pressing resistance, and the sound-generating structure 80a can provide both sound and tactile feedback. The upper end of the sound-generating structure 80a is positioned on the bottom of the tactile structure 80b, and the lower hitting portion 814a of the sound-generating structure 80a can selectively move between a pair of surfaces 101/102 of the casing 10a. In the mute-on mode of FIGS. 13A/13B, the lower hitting portion 814a of the sound-generating structure 80a is interfered to be confined on the surface 102. In FIGS. 13C and 13D, the tactile structure 80b is not interfered and not confined so to be in the mute-off mode.

Specifically, in FIGS. 13C and 13D, the adjusting mechanism 90a does not interfere with the lower hitting portion 814a of the sound-generating structure 80a, so the lower hitting portion 814a is not confined on the surface 102. Accordingly, the lower hitting portion 814a of the sound-generating structure 80a can move between the pair of surfaces 101/102 of the casing 10a. In FIG. 13C, the pressable portion 22 of FIG. 11 is in the non-pressed state, and the lower hitting portion 814a of the sound-generating structure 80a is attracted on the surface 101 by the magnet 103 of the casing 10a. When the tactile structure 80b receives the external force transmitted through the pressable portion 22 and the pressable rod 801, the right half portion of the tactile structure 80b rotates downward and presses the sound-generating structure 80a. Once the elastic force of the sound-generating structure 80a accumulated during pressing exceeds the magnetic force of the magnet 103, the lower hitting portion 814a of the sound-generating structure 80a will escape from the surface 101 to strongly hit the surface 102, so as to generate a hitting sound in response to the pressing operation of the key 2 as the operation feedback to the user. Although the sound-generating structure 80a provides the hitting sound, in FIGS. 130/13D, the sound-generating structure 80a is first pressed and then released, so it can also provide a tactile feedback to the user as the key 2 is pressed. In FIGS. 13A/13B, the sound-generating structure 80a does not generate the hitting sound, but the accumulated elastic force during the pressing process is increased until reaching the lowest pressing point and can be considered as a tactile feedback of gradually increased pressing resistance to the user. Therefore, the sound-generating structure 80a can provide both tactile and sound feedback, and the tactile feedback perceived by the user is actually the cooperation result of the tactile structure 80b and the sound-generating structure 80a.

Figure 14A:
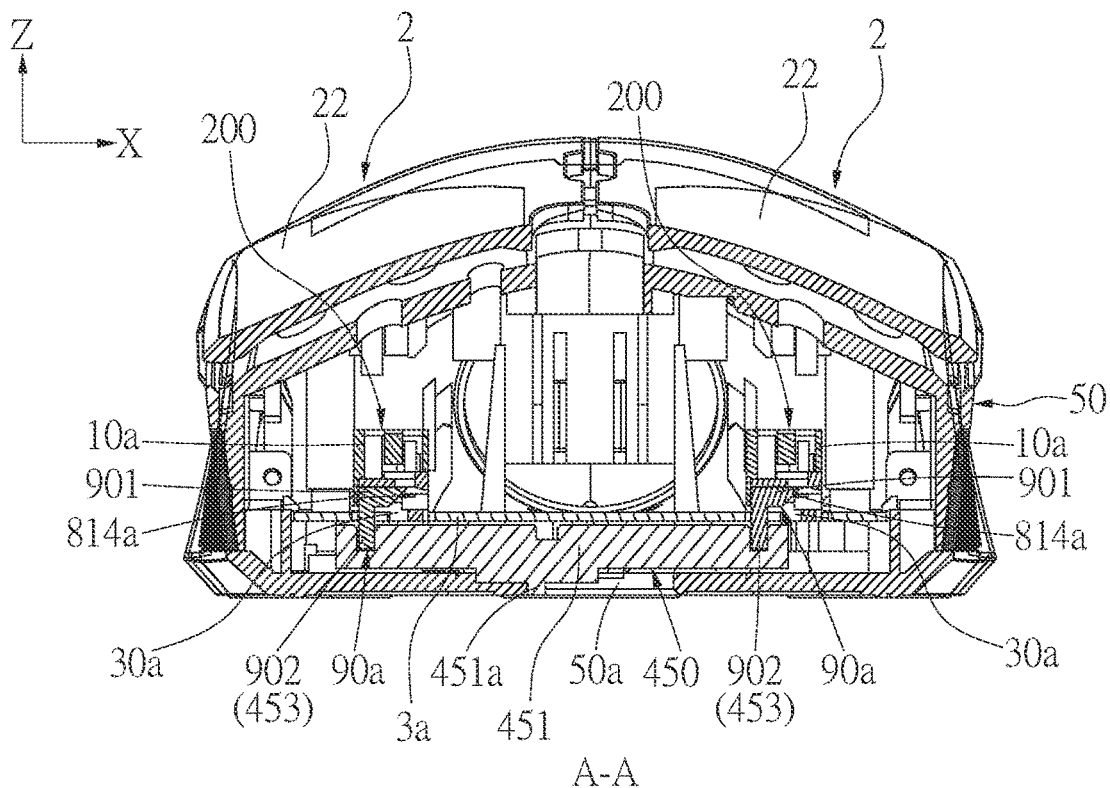
FIG. 14A is a cross-sectional view along the line A-A of FIG. 12 (with the hitting sound).
Figure 14B:
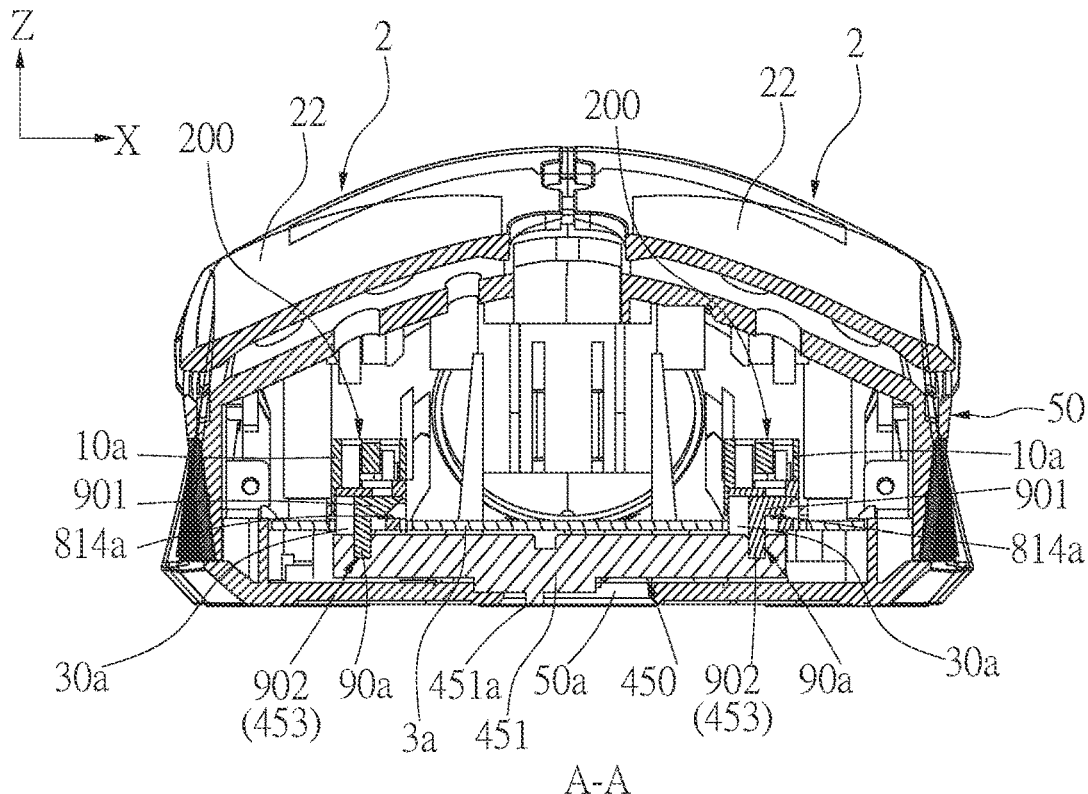
FIG. 14B is a cross-sectional view along the line A-A of FIG. 12 (without the hitting sound).
Figure 15:
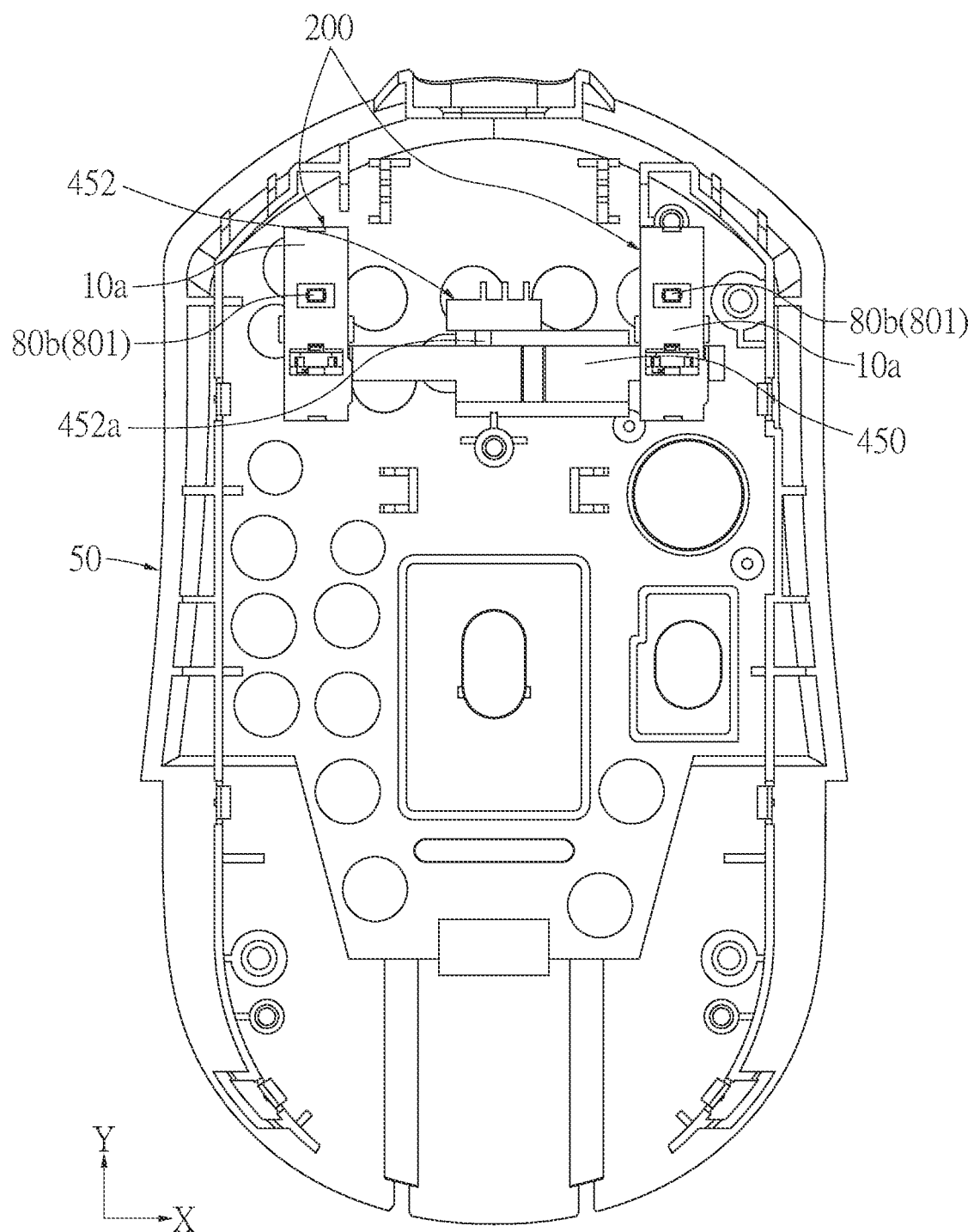
FIG. 15 is a schematic top view of the input device of FIG. 11 (without showing the upper casing and the circuit board)
Figure 16:
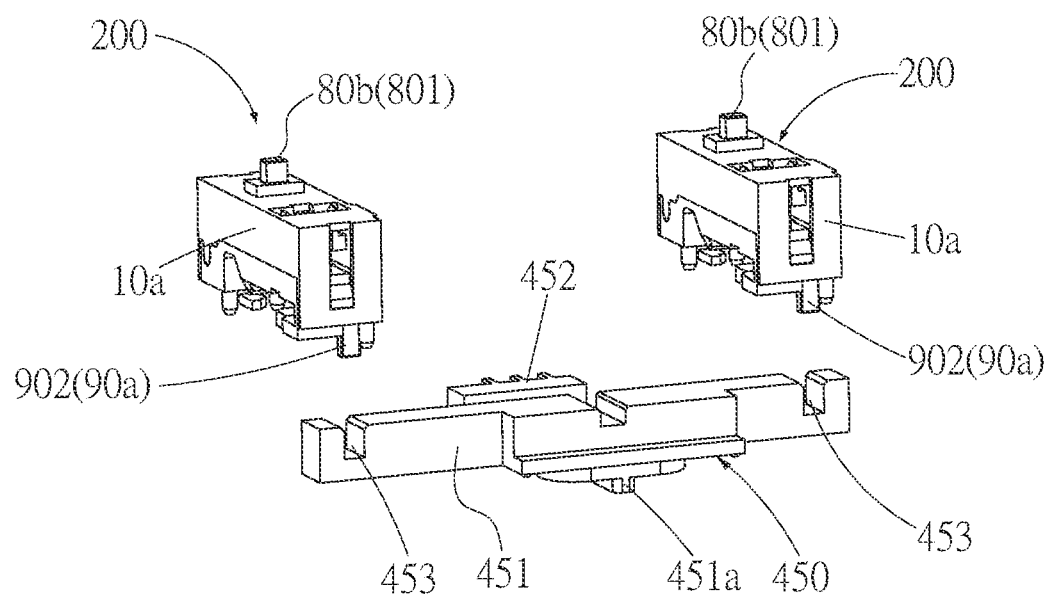
FIG. 16 is an exploded view of the base and the switching unit of the input device of FIG. 11.

Please refer to FIGS. 14A and 14B, FIGS. 15 and 16, and as needed, refer to FIGS. 11 and 12 or FIGS. 13A/136/13C/13D. For the input device having multiple keys 2 (e.g. the mouse left key/right key/middle key (corresponding to the roller)), the switching unit 450 can be designed to achieve the switching between the mute-on mode and the mute-off mode of the multiple keys 2 in a single switching operation, and to generate the corresponding switching signal to enable the mode switching of the input device. As such, after the mode switching, when the key 2 is triggered, the output device LD or SP is enabled to output the corresponding operation feedback, which is different from the operation feedback before the mode switching. For example, a keystroke sound file of different timbre/volume can be outputted, or the audible feedback can be switched to different feedback of attribute, such as light feedback. The switching unit 450 mainly includes an operating portion 451 and a switch member 452. The operating portion 451 is physically coupled to the switch member 452 and two microswitches 200. These two microswitches 200 are respectively disposed at locations corresponding to the pressable portions 22 of the left and right keys 2 of the input device (mouse). As such, when the two pressable portions 22 are pressed, the external force can be transferred to the tactile structures 80b (the pressable rods 801) of the two microswitches 200. The operating portion 451 which longitudinally extends at one side of the two microswitches 200 has two connection portions 453 at two ends. The two connection portions 453 couple to the lower ends 902 of the L-shaped adjusting mechanisms 90a in a concave-convex configuration, respectively. The switch member 452 can be implemented as, for example, a slide switch, a pair of conductive electrodes, a capacitive switch, an optical switch, a magnetic switch, or a piezoelectric switch, and can be located between two parallel extension lines of the two microswitches 200. The operating portion 451 is perpendicular to the two parallel extension lines of the two microswitches 200. The switch member 452 has a sliding portion 452a which extends toward the operating portion 451. When the operating portion 451 moves back and forth, the sliding portion 452a will slide back and forth to trigger the switch member 452, so as to generate different switching signals. Such switching signals are associated with the mode switching of the keys 2 and the microswitch 200 thereof between different tactile modes and/or different sound modes. The operating portion 451 further has a pushing member 451a, which extends toward outside of the housing 50 and passes the operation hole 50a of the housing 50, so the pushing member 451a can be exposed outside the housing 50 for the user to operate. In FIG. 14A, the operating portion 451 is located near the left side, and the two adjusting mechanisms 90 are also located near the left side. Meanwhile, the adjusting mechanism 90a does not interfere with the lower hitting portion 814a of the sound-generating structure 80a, and the lower hitting portion 814a is positioned on the surface 101 of the casing 10a (as shown in FIG. 13C), i.e., the two keys 2 and the microswitches 200 thereof are in the mute-off mode. In such a configuration, when one of the pressable portions 22 of the two keys 2 is pressed by an external force, the external force will be transferred to the linkage member 802 through the tactile structure 80b (pressable portion 801). The linkage member 802 rotates to compress the sound-generating structure 80a until the accumulated force of the sound-generating structure 80a exceeds the magnetic force of the magnet 103, and then the hitting portion 814a hits the surface 102 to generate the hitting sound (FIG. 13D). In FIG. 14B, the operating portion 451 moves from the left position to the right position, and the two adjusting mechanisms 90 also move to the right position. Meanwhile, the adjusting mechanism 90a interferes with the lower hitting portion 814a of the sound-generating structure 80a, and the hitting portion 814a is confined on the surface 102 of the casing 10a (as shown in 13A/13B), i.e., the two keys 2 and the microswitches 200 thereof are in the mute-on mode. In such a configuration, when one of the pressable portions 22 of the two keys 2 is pressed by an external force, although the external force is transferred to the linkage member 802 through the tactile structure 80b (the pressable rod 801) to rotate the linkage member 802 and compress the sound-generating structure 80a, the sound-generating structure 80a merely accumulates the force to increase the pressing resistance, and the hitting portion 814a cannot generate the hitting sound (FIG. 13 A/13B). During the movement of the operating portion 451 from the left position of FIG. 14A to the right position of FIG. 14B, the sliding portion 452a is driven to slide and trigger the switch member 452 to generate the switching signal. As such, after switching to the mute-on mode, the output device (the speaker SP or the light device LD of FIGS. 11/12) electrically connected to the input device can output the corresponding keystroke sound file or change the light signal in response to the pressing of the key 2 as the operation feedback to the user.

FIGS. 13A/13B/13C/13D include implicit embodiments different from FIGS. 14A/14B/15/16. For example, the lower end 902 of the adjustment mechanism 90a of FIG. 13A/13B/13C/13D can continuously extend to penetrate the casing 10a (the through hole 100a), the circuit board 3a (the board hole 30a), and the housing 50 to be exposed from the operation hole 50a. The end portion of lower end 902 of the adjusting mechanism 90a can be formed as the pushing member 451a for the user to operate. For the switching of a single key 2, the lower end 902 of the adjusting mechanism 90a can function as the operating portion 451 of the switching unit 450. This means that the input device can be provided with multiple operating portions 451, multiple switch members 452, which respectively correspond to the multiple operating portions 451, and each of the switch members 452 couples to a single microswitch 200. Such a configuration can be referred to the design of FIG. 10, so the operation of the switching unit 450 for a single key 2 and the microswitch 200 thereof can generate the switching signal. Accordingly, the multiple keys 2 of the input device can be independently switched to respective mode for outputting the corresponding operation feedback. Moreover, in the drawings and the embodiments, merely two microswitches 200 are illustrated for synchronous mode switching or independent mode switching, but not limited thereto. The input device may have two or more than two keys 2 with the microswitches 200 to achieve the synchronous switching of the keys 2 between the mute-on mode and the mute-off mode. For example, the left, middle, and right keys 2 with their corresponding microswitches 200 of the mouse (the input device) can be relatively disposed in a triangle configuration, so a T-shaped operating portion 451 can couple to the three microswitches 200 and the switch member 452 to achieve the mode switching operation of the three keys at the same time. In a different embodiment, the operating portion 451 of the switching unit 450 can be integrally formed with multiple adjusting mechanisms 90a to achieve the synchronous mode switching of the multiple microswitches 200/keys 2. Moreover, for the mode switching operation itself, the output device can provide switching feedback. For example, the light signal of the light device LD can be used to prompt the user, indicating that the mode switching of the input device is completed or indicating that the input device is in which mode.

Through the device and the method disclosed in the embodiments of the invention, when the key of the input device is switched to the mute-on mode, the user still can listen to the operation sound file corresponding to the first tactile mode via the near-ear device to receive the corresponding audible feedback or visual/haptic feedback. Moreover, when the key of the input device is in the mute-on mode without generating the hitting sound (operating sound), the output device can still play the operation sound file at a given volume or provide the visual/haptic operation feedback in response to the tactile mode switching of the key, so as to satisfy the feedback demand of the user on different operation situations. No matter whether the input device has a built-in output device, the input device is directly connected to the output device, or the input device is connected to the output device through the host, the output device can respond to the switching event of the tactile mode and/or the sound mode of the input device. In other words, in response to the switching signal and the input signal, the output device can output the operation sound file or the visual/haptic operation feedback corresponding to the current tactile mode/sound mode of the input device. In addition, for the synchronous mode switching of multiple keys, the operating portion of the switching unit can be connected to all adjusting mechanisms and the switch member, so when the tactile structures or the sound-generating structures are adjusted by the adjusting mechanisms, the switch member is also triggered to generate the switching signal to enable the output device to output different operation feedback after the mode switching operation.

Although the preferred embodiments of the present invention have been described herein, the above description is merely illustrative. The preferred embodiments disclosed will not limit the scope of the present invention. Further modification of the invention herein disclosed will occur to those skilled in the respective arts and all such modifications are deemed to be within the scope of the invention as defined by the appended claims.

What is claimed is:

1. An input device directly or indirectly coupled to an output device, the input device comprising:
   at least one key having a tactile structure and a sound-generating structure adjustably interfering with an operation path of the at least one key to respectively generate a tactile feedback and an operating sound;
   a switching unit having an operating portion operable by a user, the switching unit capable of generating a switching signal involving a mode switching of the at least one key between different tactile modes and/or different sound modes; and
   an adjusting mechanism having at least one adjusting portion adapted to move in response to the mode switching to drive the tactile structure and/or the sound-generating structure, so as to adjust an interference ratio of the tactile structure and/or the sound-generating structure to the operation path,
   wherein after the mode switching occurs, independently from the tactile structure and/or the sound-generating structure, the output device is enabled to output an operation feedback according to the switching signal as the at least one key is triggered.

2. The input device of claim 1, wherein the input device is a keyboard; the adjusting mechanism includes an adjusting plate for disposing the at least one adjusting portion; the at least one adjusting portion abuts against the tactile structure and/or the sound-generating structure and is adapted to push the tactile structure and/or the sound-generating structure as the adjusting plate moves, so as to adjust the interference ratio of the tactile structure and/or the sound-generating structure to the operation path.

3. The input device of claim 1, wherein the input device is a keyboard; the input device further comprises an electric drive module coupled to the switching unit and the adjusting mechanism; the electric drive module directly or indirectly drives the at least one adjusting portion to move in response to the switching signal.

4. The input device of claim 1, wherein the input device is a keyboard; the input device further comprises a linkage mechanism coupled to the switching unit and the adjusting mechanism; when the operating portion of the switching unit receives a force to move, the linkage mechanism directly or indirectly drives the at least one adjusting portion of the adjusting mechanism to move.

5. The input device of claim 1, wherein the input device is a keyboard; the input device further comprises a linkage mechanism coupled to the switching unit and the adjusting mechanism; when the operating portion of the switching unit receives a force to rotate, the linkage mechanism directly or indirectly drives the at least one adjusting portion of the adjusting mechanism to move.

6. The input device of claim 1, wherein the input device is a mouse; the at least one key comprises a roller; the tactile structure and/or the sound-generating structure comprises a ratchet co-axially disposed with the roller; the adjusting mechanism comprises a transmission arm coupled to the at least one adjusting portion; the at least one adjusting portion has a bump selectively engaging with or disengaging from at least one ratchet tooth of the ratchet to achieve the mode switching.

7. The input device of claim 1, wherein the input device is a mouse; the switching unit and the adjusting mechanism are at least partially located under the at least one key; the switching unit comprises the operating portion in a turning knob form and a linkage mechanism in a long rod form; the adjusting mechanism comprises a plurality of blocks located on the linkage mechanism at different positions and different angles; when the switching unit receives a force to rotate, one of the plurality of blocks abuts below the at least one key to switch a pressing fulcrum or an operation distance of the at least one key, so as to achieve the mode switching.

8. The input device of claim 1, wherein the at least one key is a microswitch; at least one of the tactile structure and the sound-generating structure comprises an elastic member; the elastic member has an upper end adapted to move close to or away from a distal end of the elastic member when the microswitch is pressed under a force or released from the force; the distal end extends to be located between a first surface and a second surface in the microswitch; the distal end of the elastic member is temporarily positioned on one of the first surface and the second surface in response to the movement of the adjusting mechanism to achieve the mode switching.

9. The input device of claim 1, wherein the input device and the output device are coupled to a host in a wired or wireless manner; after the switching signal is generated, the host outputs the operation feedback to the output device for output.

10. An input feedback method applicable to an input device and an output device directly or indirectly coupled with each other, the input device comprising at least one key, a tactile structure of the at least one key adjustably interfering with an operation path of the at least one key to provide a tactile feedback when the at least one key is in a first tactile mode and a mute-on mode, the method comprising:

in the first tactile mode, a switching unit of the input device generating a switching signal involving a mode switching of the at least one key between different tactile modes;

in response to the mode switching, an adjusting mechanism of the input device adjusting an interference ratio of the tactile structure to the operation path to enable the at least one key to enter a second tactile mode while the at least one key remains in the mute-on mode;

the at least one key generating an input signal when being pressed and triggered; and independently from the tactile structure and/or the sound-generating structure, the output device outputting a second operation feedback according to the switching signal when the at least one key is triggered in the second tactile mode.

11. The input feedback method of claim 10, wherein the input device and the output device are coupled to a host in a wired or wireless manner; after the switching signal is generated, the host outputs the second operation feedback to the output device for output.

12. The input feedback method of claim 10, wherein the at least one key further comprises a sound-generating structure adjustably interfering or not interfering with the operation path of the at least one key to selectively generate an operating sound.

13. An input device, comprising:

a plurality of keys, each of the keys having a tactile structure and a sound-generating structure to respectively generate a tactile feedback and an operating sound when the key is pressed;

a plurality of adjusting mechanisms, each of the adjusting mechanisms having an adjusting portion corresponding to a corresponding one of the keys; and at least one switching unit having an operating portion and a switch member, the operating portion coupled to the switch member and the adjusting mechanisms, the switch member capable of generating a switching signal involving a mode switching of the keys between different tactile modes and/or different sound modes, wherein when the operating portion receives a force to move, the switch member is triggered to achieve the mode switching; meanwhile, for each of the keys, the adjusting mechanism moves with the operating portion to enable the adjusting portion to interfere with at least one of the tactile structure and the sound-generating structure.

14. The input device of claim 13, wherein the input device is coupled to an output device; after the mode switching occurs, the output device outputs an operation feedback according to the switching signal when one of the keys is pressed.

15. The input device of claim 13, wherein the input device is coupled to an output device; the output device outputs a switching feedback when the mode switching occurs.

16. The input device of claim 13, wherein each of the keys comprises a pressable portion and a microswitch; for each of the keys, the tactile structure and the sound-generating structure are disposed in the microswitch, and when the pressable portion receives a force to move downward, the force is transferred to the tactile structure and/or the sound-generating structure.

17. The input device of claim 13, wherein each of the keys comprises a microswitch; for each of the keys, the sound-generating structure has a hitting portion located between a first surface and a second surface in the microswitch, and the hitting portion moves with the adjusting mechanism to be positioned on the second surface to achieve the mode switching.

18. The input device of claim 13, wherein each of two of the keys includes a microswitch; the switch member is located between two parallel extension lines of the two microswitches; the operating portion is perpendicular to the two parallel extension lines of the two microswitches.

19. The input device of claim 13, wherein for each of the keys, the sound-generating structure is interfered and restricted by the adjusting mechanism, so the sound-generating structure does not generate the operating sound when the key is pressed.

20. The input device of claim 13, wherein for each of the keys, the adjusting mechanism interferes with the sound-generating structure and does not interfere with the tactile structure, so the sound-generating structure is inoperable when the key is pressed, and the tactile structure still generates the tactile feedback.

* * * * *